US011014801B2

(12) United States Patent
James et al.

(10) Patent No.: US 11,014,801 B2
(45) Date of Patent: May 25, 2021

(54) COUPLER FOR USE IN A CLOSED TRANSFER SYSTEM

(71) Applicant: Pentair Flow Technologies, LLC, Delavan, WI (US)

(72) Inventors: Roger James, Willingham (GB); Ben Freeston, Littleport (GB); Claire Potter, Fulbourn (GB); Richard Garnett, Fawley (GB); Sam Pullen, Kings Caple (GB)

(73) Assignee: Pentair Flow Technologies, LLC, Delavan, WI (US)

( * ) Notice: Subject to any disclaimer, the term of this patent is extended or adjusted under 35 U.S.C. 154(b) by 260 days.

(21) Appl. No.: 16/188,850

(22) Filed: Nov. 13, 2018

(65) Prior Publication Data

US 2019/0144256 A1 May 16, 2019

Related U.S. Application Data

(60) Provisional application No. 62/584,679, filed on Nov. 10, 2017.

(51) Int. Cl.
*B67D 1/00* (2006.01)
*B67D 7/02* (2010.01)
(Continued)

(52) U.S. Cl.
CPC .......... *B67D 7/0294* (2013.01); *A01C 23/007* (2013.01); *B67D 7/0277* (2013.01);
(Continued)

(58) Field of Classification Search
None
See application file for complete search history.

(56) References Cited

U.S. PATENT DOCUMENTS

| 2,563,930 A | 8/1951 | Hamann et al. |
| 3,123,107 A | 3/1964 | Kappler |

(Continued)

FOREIGN PATENT DOCUMENTS

| AU | 759134 B2 | 11/1999 |
| AU | 751947 B2 | 5/2000 |

(Continued)

OTHER PUBLICATIONS

International Search Report and Written Opinion from the International Searching Authority for PCT/US18/60613; dated Feb. 7, 2019; 14 pages.

(Continued)

*Primary Examiner* — Michael E Barr
*Assistant Examiner* — Jason P Riggleman
(74) *Attorney, Agent, or Firm* — Husch Blackwell LLP

(57) ABSTRACT

Embodiments of the invention provide a coupler for use in a closed transfer system configured to selectively engage a container seated in fluid communication with the coupler. The coupler has a body with a slot having an axial component, and an outlet. A probe extends from a first end portion to a second end portion and is at least partially received within the body, the probe is configured to be movable relative to the body between a first position and a second position to selectively control a flow of fluid through the outlet. A probe tip with a cylindrical bore is configured to engage the second end portion of the probe, and a handle is coupled to the probe and configured to interface with the slot. Axial movement of the handle along the slot moves the probe between the first position and the second position.

19 Claims, 30 Drawing Sheets

(51) Int. Cl.

| | | |
|---|---|---|
| *F16K 1/12* | (2006.01) | |
| *F16L 29/00* | (2006.01) | |
| *F16K 31/60* | (2006.01) | |
| *F16K 5/02* | (2006.01) | |
| *B67D 7/78* | (2010.01) | |
| *F16K 31/56* | (2006.01) | |
| *G01F 3/00* | (2006.01) | |
| *A01C 23/00* | (2006.01) | |

(52) U.S. Cl.
   CPC .................. *B67D 7/78* (2013.01); *F16K 1/12* (2013.01); *F16K 5/0214* (2013.01); *F16K 31/56* (2013.01); *F16K 31/607* (2013.01); *F16L 29/007* (2013.01); *G01F 3/00* (2013.01); *B67D 2210/00062* (2013.01)

(56) References Cited

U.S. PATENT DOCUMENTS

| | | |
|---|---|---|
| 3,856,570 A | 12/1974 | McDermott |
| 3,877,682 A | 4/1975 | Moss |
| 3,913,606 A | 10/1975 | Anderson, Jr. |
| 3,916,924 A | 11/1975 | McGowan |
| 3,976,087 A | 8/1976 | Bolton et al. |
| 4,088,245 A | 5/1978 | Brown |
| 4,108,336 A | 8/1978 | Anderson, Jr. |
| 4,119,114 A | 10/1978 | Bolton et al. |
| 4,142,545 A | 3/1979 | Billigmeier |
| 4,144,901 A | 3/1979 | Stevenson |
| 4,161,197 A | 7/1979 | Stevenson |
| 4,166,481 A | 9/1979 | Farris et al. |
| 4,195,672 A | 4/1980 | Freeman |
| 4,254,805 A | 3/1981 | Reeder |
| 4,344,469 A | 8/1982 | Brown |
| 4,386,637 A | 6/1983 | Buchanan et al. |
| 4,638,926 A | 1/1987 | Brock |
| 4,741,368 A | 5/1988 | Crumby |
| 4,802,513 A | 2/1989 | Reynolds |
| 4,854,486 A | 8/1989 | Daley et al. |
| 4,872,467 A | 10/1989 | Ballu |
| 4,905,871 A | 3/1990 | Dutertre |
| 4,925,096 A | 5/1990 | Gill |
| 4,999,124 A | 3/1991 | Copeland |
| 5,042,698 A | 8/1991 | Fessell |
| 5,107,893 A | 4/1992 | Adkins |
| 5,179,975 A | 1/1993 | Stevenson |
| 5,195,873 A | 3/1993 | Claussen et al. |
| 5,199,472 A | 4/1993 | Rollison |
| 5,224,527 A | 7/1993 | McCunn et al. |
| 5,240,326 A | 8/1993 | Evanson |
| 5,248,070 A | 9/1993 | Nolte et al. |
| 5,265,653 A | 11/1993 | Herlth |
| 5,299,606 A | 4/1994 | Schrupp |
| 5,348,058 A | 9/1994 | Ruhl |
| 5,356,036 A | 10/1994 | Garnett |
| 5,404,901 A | 4/1995 | Pickrell et al. |
| 5,413,152 A | 5/1995 | Burrows |
| 5,419,348 A | 5/1995 | Kuta |
| 5,425,404 A | 6/1995 | Dyer |
| 5,426,137 A | 6/1995 | Allen |
| 5,435,451 A | 7/1995 | Dyer |
| 5,450,881 A | 9/1995 | Patterson |
| 5,465,875 A | 11/1995 | Gamett |
| 5,474,112 A | 12/1995 | Carola |
| 5,558,252 A | 9/1996 | Stapensea et al. |
| 5,641,012 A | 6/1997 | Silversides |
| 5,653,270 A | 8/1997 | Burrows |
| 5,737,709 A | 4/1998 | Getty et al. |
| 5,741,237 A | 4/1998 | Walker |
| 5,758,799 A | 6/1998 | Patterson |
| 5,765,610 A | 6/1998 | Brown |
| 5,865,343 A | 2/1999 | Busch et al. |
| 5,876,511 A | 3/1999 | Till |
| 5,878,924 A | 3/1999 | Johnson |
| 5,947,171 A | 9/1999 | Woodruff |
| 5,960,840 A | 10/1999 | Simmel et al. |
| 5,988,456 A | 11/1999 | Laible |
| 5,996,600 A | 12/1999 | Ostry |
| 6,045,010 A | 4/2000 | Patterson |
| 6,126,045 A | 10/2000 | Last |
| 6,142,345 A | 11/2000 | Laible |
| 6,158,486 A | 12/2000 | Olson et al. |
| 6,170,543 B1 | 1/2001 | Simmel et al. |
| 6,193,113 B1 | 2/2001 | Hidding |
| 6,223,791 B1 | 5/2001 | Arsenault et al. |
| 6,283,330 B1 | 9/2001 | Gillespie et al. |
| 6,349,858 B1 | 2/2002 | Kingsford et al. |
| 6,354,346 B2 | 3/2002 | Arsenault et al. |
| 6,367,521 B2 | 4/2002 | Dyer et al. |
| 6,390,156 B1 | 5/2002 | Hetherington et al. |
| 6,615,880 B2 | 9/2003 | Hewlitt et al. |
| 6,715,515 B2 | 4/2004 | Klemme et al. |
| 6,761,318 B2 | 7/2004 | Dudek et al. |
| 6,945,433 B2 | 9/2005 | Laible |
| 7,066,215 B1 | 6/2006 | Hewlitt et al. |
| 7,121,437 B2 | 10/2006 | Kasting |
| 7,331,488 B2 | 2/2008 | Naslund et al. |
| 7,597,220 B2 | 10/2009 | Lim |
| 7,631,588 B2 | 12/2009 | Osterloh |
| 7,686,194 B2 | 3/2010 | Kasting |
| 7,828,174 B2 | 11/2010 | Doehnert |
| 7,878,100 B2 | 2/2011 | Osterloh |
| 7,878,219 B2 | 2/2011 | Krywitsky |
| 8,113,240 B2 | 2/2012 | Blanchard et al. |
| 8,133,328 B2 | 3/2012 | Delaney et al. |
| 8,236,175 B2 | 8/2012 | Maeda et al. |
| 8,382,979 B2 | 2/2013 | Maeda et al. |
| 8,430,134 B2 | 4/2013 | Gill |
| 8,430,139 B2 | 4/2013 | Pell et al. |
| 8,579,162 B2 | 11/2013 | Dyer et al. |
| 8,752,586 B2 | 6/2014 | Blanchard et al. |
| 8,875,726 B2 | 11/2014 | Laible |
| 9,091,924 B2 | 7/2015 | George et al. |
| 9,310,003 B2 | 4/2016 | Blanchard et al. |
| 9,334,992 B2 | 5/2016 | Blanchard et al. |
| 9,625,044 B2 | 4/2017 | Bjemulf et al. |
| 9,834,429 B2 | 12/2017 | Oeser et al. |
| 9,873,138 B2 | 1/2018 | Eck |
| 9,874,293 B2 | 1/2018 | Blanchard et al. |
| 2002/0091596 A1 | 7/2002 | Dudek et al. |
| 2003/0010359 A1 | 1/2003 | Knapp |
| 2003/0075233 A1 | 4/2003 | Hewlitt et al. |
| 2006/0213565 A1 | 9/2006 | Steingass |
| 2008/0041493 A1 | 2/2008 | Lin et al. |
| 2008/0121639 A1 | 5/2008 | Dohnert et al. |
| 2008/0277001 A1 | 11/2008 | Wheaton |
| 2009/0095322 A1 | 4/2009 | Wakao et al. |
| 2010/0212764 A1 | 8/2010 | Grizzle et al. |
| 2010/0213277 A1 | 8/2010 | Bowen |
| 2012/0145937 A1 | 6/2012 | Richman et al. |
| 2013/0327406 A1 | 12/2013 | Krampe et al. |
| 2016/0129404 A1 | 5/2016 | Pasquier et al. |
| 2016/0185494 A1 | 6/2016 | Sasturain et al. |
| 2016/0185588 A1 | 6/2016 | Huber |
| 2016/0194118 A1 | 7/2016 | Huber et al. |
| 2016/0214150 A1 | 7/2016 | Inoue et al. |
| 2017/0191595 A1 | 7/2017 | Van Scyoc |

FOREIGN PATENT DOCUMENTS

| | | |
|---|---|---|
| AU | 781288 B2 | 4/2001 |
| AU | 2013286085 A1 | 1/2015 |
| BR | 9903244 A | 5/2000 |
| BR | 0014891 A | 7/2002 |
| CA | 2920716 A1 | 2/2015 |
| CN | 105107808 A | 12/2015 |
| DE | 3210339 A1 | 10/1983 |
| DE | 3804474 A1 | 9/1989 |
| EP | 0222701 A2 | 5/1987 |
| EP | 1098836 B1 | 5/2001 |
| EP | 1222135 B1 | 7/2002 |
| EP | 1277181 A2 | 1/2003 |
| EP | 1512638 A2 | 3/2005 |
| EP | 1706701 B1 | 4/2006 |

(56) References Cited

FOREIGN PATENT DOCUMENTS

| EP | 2510273 B1 | 10/2012 |
|---|---|---|
| EP | 2870399 B1 | 5/2015 |
| GB | 2306457 A | 7/1997 |
| GB | 2448236 A | 10/2008 |
| WO | 9617513 A1 | 6/1996 |
| WO | 9905446 A1 | 2/1999 |
| WO | 2006048067 A1 | 5/2006 |
| WO | 2009098194 A1 | 8/2009 |
| WO | WO2018/115285 A1 * | 6/2018 |

OTHER PUBLICATIONS

International Search Report and Written Opinion from the International Searching Authority for PCT/US18/60634; dated Feb. 7, 2019; 64 pages.
U.S. Pat. No. 0,969,090; issue date Aug. 30, 1910; Culbertson et al.

* cited by examiner

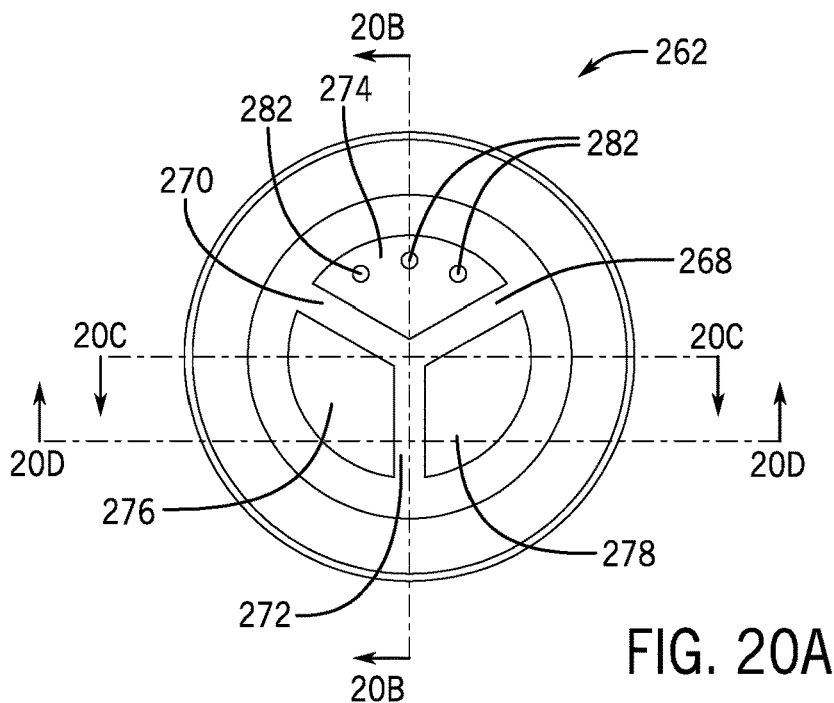
FIG. 20A
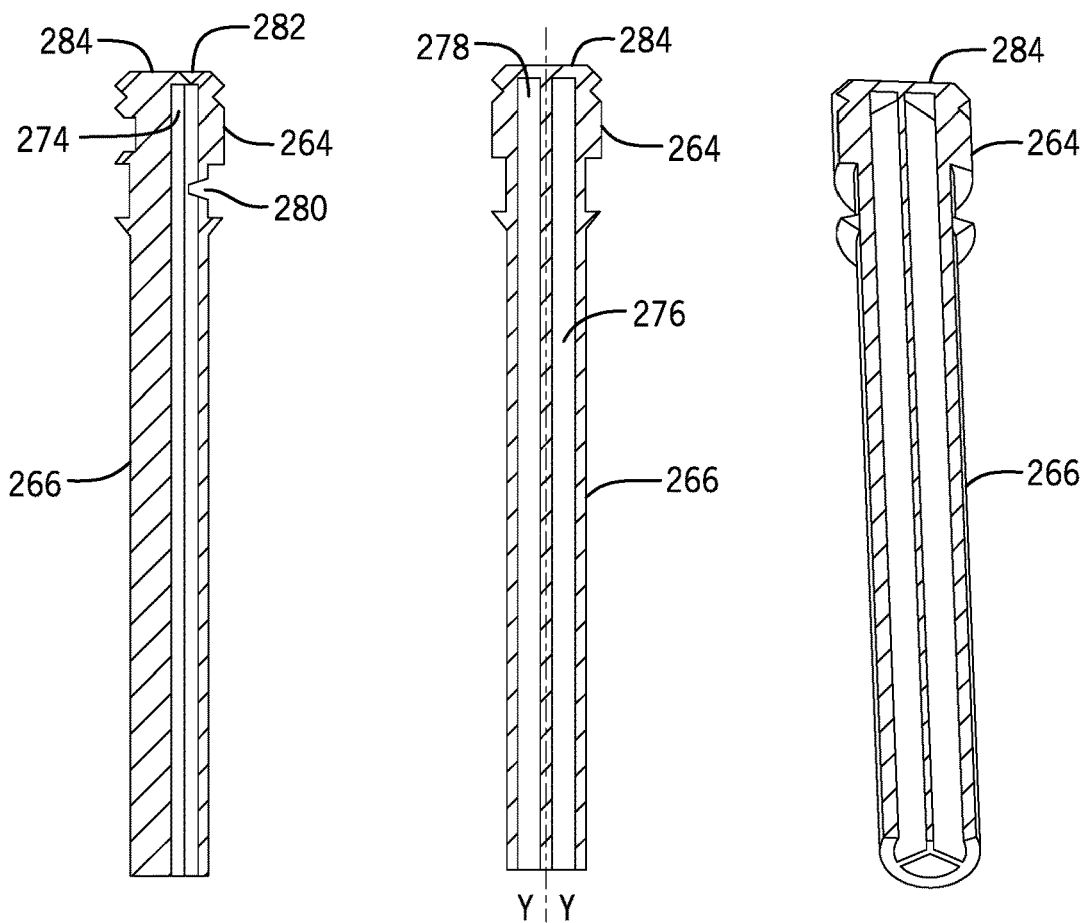
FIG. 20B
FIG. 20C
FIG. 20D

COUPLER FOR USE IN A CLOSED TRANSFER SYSTEM

RELATED APPLICATIONS

This application claims the benefit of U.S. Provisional Patent Application No. 62/584,679 filed on Nov. 10, 2017, the entire contents of which are incorporated herein by reference.

BACKGROUND

The invention relates to closed transfer systems and methods. Specifically, the invention relates to closed transfer systems and methods incorporating a coupling system, a cleaning system, and a transfer system that can be used in connection with a closed transfer system.

Hazardous chemicals are frequently used in various applications, such as agriculture. While the hazardous chemicals may be effective when applied properly (e.g., pesticides applied to crops), overexposure may be undesirable. Therefore, regulations often govern the types of vessels and containers that can be used to store and transfer chemicals.

Hazardous chemicals are removed or transferred from their containers in the course of being used for their ultimate application. Because the chemicals may have undesirable impacts if improperly used or applied, spills and leaks during chemical transfer is preferably avoided. A closed transfer system (CTS) can be used to efficiently transport chemicals from within their chemical containers toward other receptacles or dispensing mechanisms. Chemical containers can be coupled to a CTS, which can use a pressure differential to motivate chemicals out of the container.

SUMMARY

Some embodiments of the invention provide a coupler for use in a closed transfer system configured to selectively engage a container seated in fluid communication with the coupler. The coupler can have a body with a slot having an axial component, an outlet, and a probe that extends from a first end portion to a second end portion and is at least partially received within the body. The probe can be configured to be movable relative to the body between a first position and a second position to selectively control a flow of fluid through the outlet. The coupler can have a probe tip with a cylindrical bore configured to engage the second end portion of the probe, and a handle coupled to the probe and configured to interface with the slot, wherein axial movement of the handle along the slot moves the probe between the first position and the second position.

Some embodiments of the invention provide a coupler for use in a closed transfer system having a body with an axial slot, an outlet, and a probe with an inlet near a first end of the probe, a probe tip near a second end of the probe, and a channel configured to supply a fluid from the inlet to the probe tip. The probe can be at least partially received within the body and axially movable relative to the body between a first position and a second position to provide selective fluid communication through the outlet. The coupler can have a handle coupled to the probe and configured to move within the axial slot, wherein movement of the handle within the axial slot directly corresponds to movement of the probe within the body.

Some embodiments of the invention provide a coupler for use in a closed transfer system with a body having a slot with an axial slot portion and a radial slot portion. The axial slot portion can have a top end and a bottom end, and the radial slot portion can have a terminal end and an intersecting end that intersects the bottom end of the axial slot portion. The coupler can have a probe received within the body and movable between a first position and a second position, and a probe tip coupled to the probe. A handle can be coupled to the probe and movable along the slot, wherein movement of the handle from the terminal end to the intersecting end of the radial slot portion positions the probe for axial movement between the first position and the second position.

Some embodiments of the invention provide a coupler for use in a closed transfer system. The coupler can comply with ISO21191. The coupler can have a body and an inlet and outlet in selective fluid communication with one another. A probe can be at least partially received within the body and is movable relative to the body between a first position and a second position. The probe extends away from the body further at the second position than the first position. The coupler can include a locking mechanism that receives and restrains a container. The locking mechanism can be movable between a locked an unlocked position, and can be in a locked position when the probe is in the second position.

Some embodiments of the invention provide a coupler for use in a closed transfer system. The coupler comprises a body and an inlet and outlet in selective fluid communication with one another. A probe can be at least partially received within the body. A rinsing head can be received around and rotatable relative to the probe. The rinsing head can have a vane for directing water outwardly away from the rinsing head, and can rotate about the probe in response to fluid being directed through the rinsing head.

Some embodiments of the invention provide a coupler for use in a closed transfer system. The coupler can have a cylindrical probe. The cylindrical probe can have a distal end protruding from a body of the coupler. A probe tip can be received around the distal end of the cylindrical probe. A cap can be removably received around and coupled to the probe tip. A groove can be formed in the outer section of the probe tip. The groove can extend through the probe tip to define a rinse water passage for supplying rinse water between the probe tip and the cap. In some embodiments, a drain passage can be formed through the probe tip. The drain passage can be defined by a diameter larger than the diameter defining the rinse water passage.

Some embodiments of the invention provide a coupler for use in a closed transfer system. The coupler comprises a cam locking mechanism. The cam locking mechanism can receive and secure a portion of a container. The cam locking mechanism can have an inner ring comprised of a plurality of rotatable cams received within an outer ring, which is rotatable relative to an inner ring. The outer ring can have a plurality of projections extending radially inward from a cylindrical outer wall. The plurality of projections can contact the rotatable cams to transition the cam locking mechanism between an unlocked position and a locked position.

Some embodiments of the invention provide a coupler for use in a closed transfer system. The coupler can comprise an inlet and an outlet in selective fluid communication and a probe. The probe can be at least partially received within a cylindrical body and can be movable relative to the cylindrical body. The probe defines a first fluid passageway and a second fluid passageway extending therethrough. The first fluid passageway transports a first fluid through the body and the second fluid passageway transports a second fluid different from the first fluid. In some embodiments, the second fluid passageway extends annularly around the first fluid passageway. In some embodiments, the first fluid passageway is defined by a first tube and the second passageway is defined by a second tube positioned coaxially with and around a portion of the first tube.

Some embodiments of the invention provide a chemical induction unit. The chemical induction unit comprises a drain pan defining a washing area. The drain pan can be coupled to a water source. A coupler can be mounted to the drain pan. The coupler can have a probe at least partially received within a body of the coupler and can have a rinsing head received around and rotatable relative to the probe. The rinsing head can be placed in fluid communication with the water source.

Some embodiments of the invention provide a chemical measuring system. The chemical measuring system comprises a coupler having a body. The body can have a probe received therein, which is movable between a first position and a second position relative to the body. The first position can restrict fluid communication between the inlet and the outlet, while the second position can allow fluid communication between the inlet and the outlet. A measuring container can be placed in fluid communication with the outlet. A vacuum source can be placed in selective communication with the outlet. In some embodiments, the chemical measuring system further comprises a multi-position valve adapted to selectively restrict fluid communication between the vacuum source, the measuring container, and the outlet.

These and other features of the disclosure will become more apparent from the following description of the illustrative embodiments.

BRIEF DESCRIPTION OF THE DRAWINGS

FIG. 20A is a bottom view of a probe according to an embodiment of the invention that can be present within the coupler of FIG. 2.

FIG. 20B is a cross-sectional view of the probe of FIG. 20A, taken along line 20B-20B.

FIG. 20C is a cross-sectional view of the probe of FIG. 20A, taken along line 20C-20C.

FIG. 20D is a perspective cross-sectional view of the probe of FIG. 20A, taken along line 20D-20D.

Figure 1:
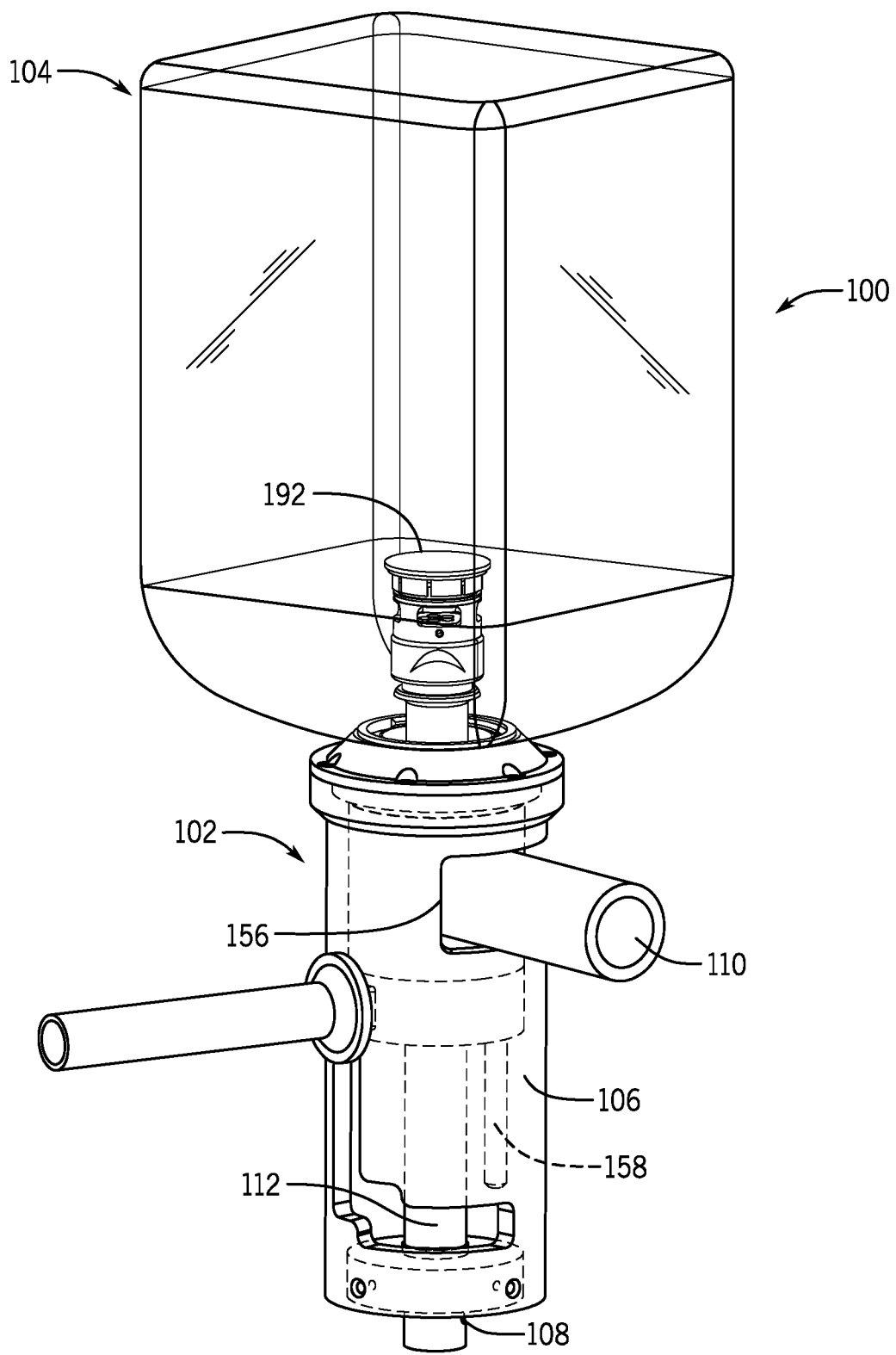
FIG. 1 is a perspective view of a closed transfer system according to one embodiment of the invention.

Corresponding reference characters indicate corresponding parts throughout the several views. Although the drawings represent embodiments of the disclosure, the drawings are not necessarily to scale and certain features may be exaggerated in order to better illustrate and explain the embodiments of the disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates a closed transfer system 100 according to one embodiment of the invention. The closed transfer system 100 includes a coupler 102 that can access and transfer the contents (e.g., chemicals) within a container 104 to a second location, such as a measuring device (e.g., a measuring container 302, shown in FIG. 21) or a sprayer (not shown). The coupler 102 can also clean or rinse containers 104, and can perform rinse cycles to self-clean some components of the coupler 102. In some embodiments, the coupler 102 can be a component of a chemical induction unit (such as the chemical induction unit 400, shown in FIG. 28-29B) to rinse chemical containers 104.

Figure 2:
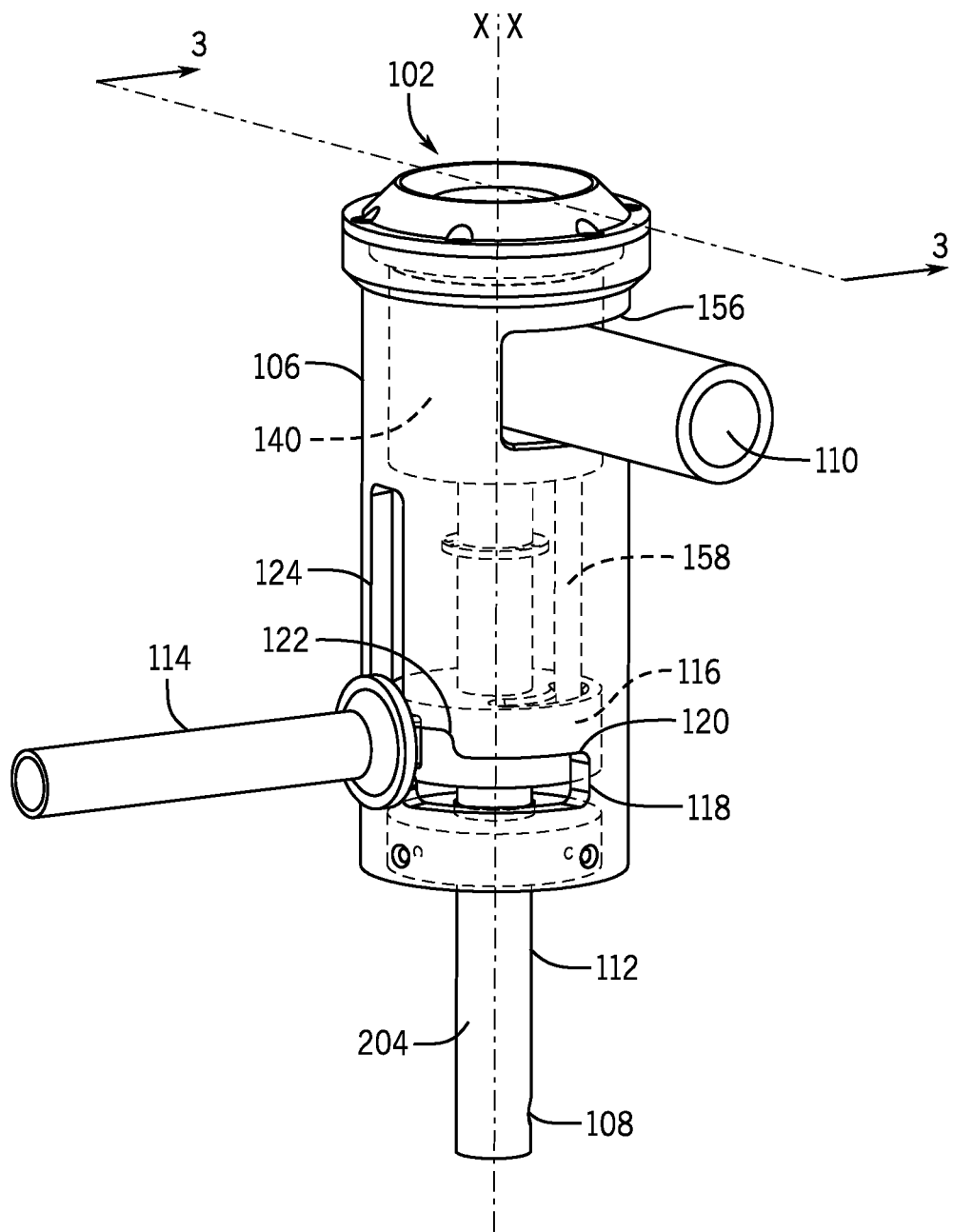
FIG. 2 is a perspective view of a coupler present within the closed transfer system of FIG. 1 in a closed position.
Figure 3:
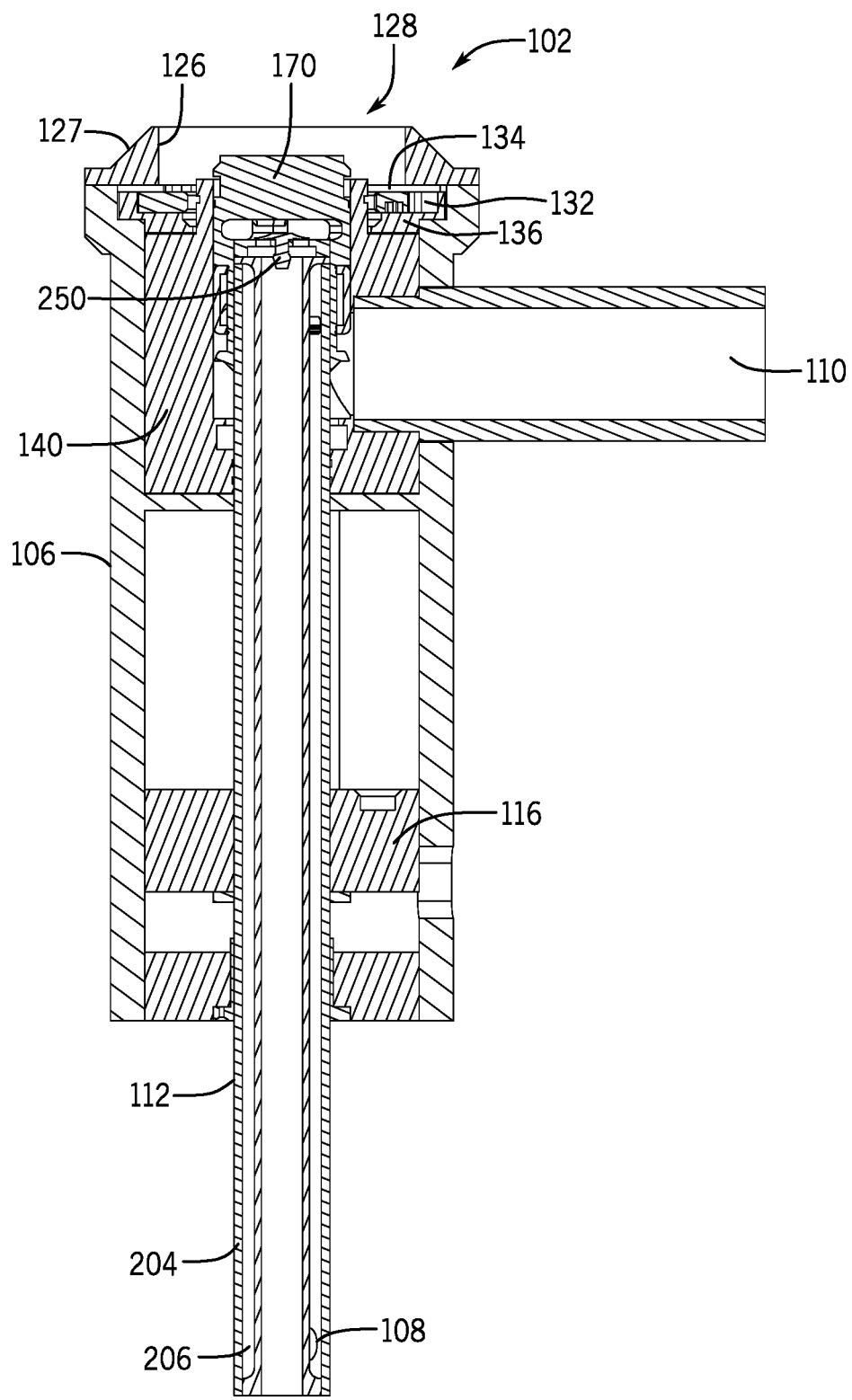
FIG. 3 is a cross-sectional view of the coupler of FIG. 2 taken along line 3-3 in FIG. 2.

FIGS. 2 and 3 show the coupler 102 in a closed orientation. The coupler 102 has a body 106 that can be cylindrical. An inlet 108 and an outlet 110 each extend outwardly from the body 106 to partially define a fluid flow path through the coupler 102. In some embodiments, the inlet 108 can be coupled to a water source, while the outlet 110 can be coupled to a vacuum or pump to pull fluid (e.g., water or chemicals) from the body 106 out of the outlet 110 and away from the coupler 102. The vacuum or pump can be omitted, as the outlet 110 can also remove fluid from the container 104 using gravity. In some embodiments, the inlet 108 and outlet 110 each extend outwardly from the body 106, and can be coupled to fluid sources and fluid receptacles, respectively. A probe 112, which includes the inlet 108, is at least partially received within the body 106 and can extend completely through the body 106. The probe 112 can selectively restrict fluid flow between the inlet 108 and the outlet 110.

Figure 4:
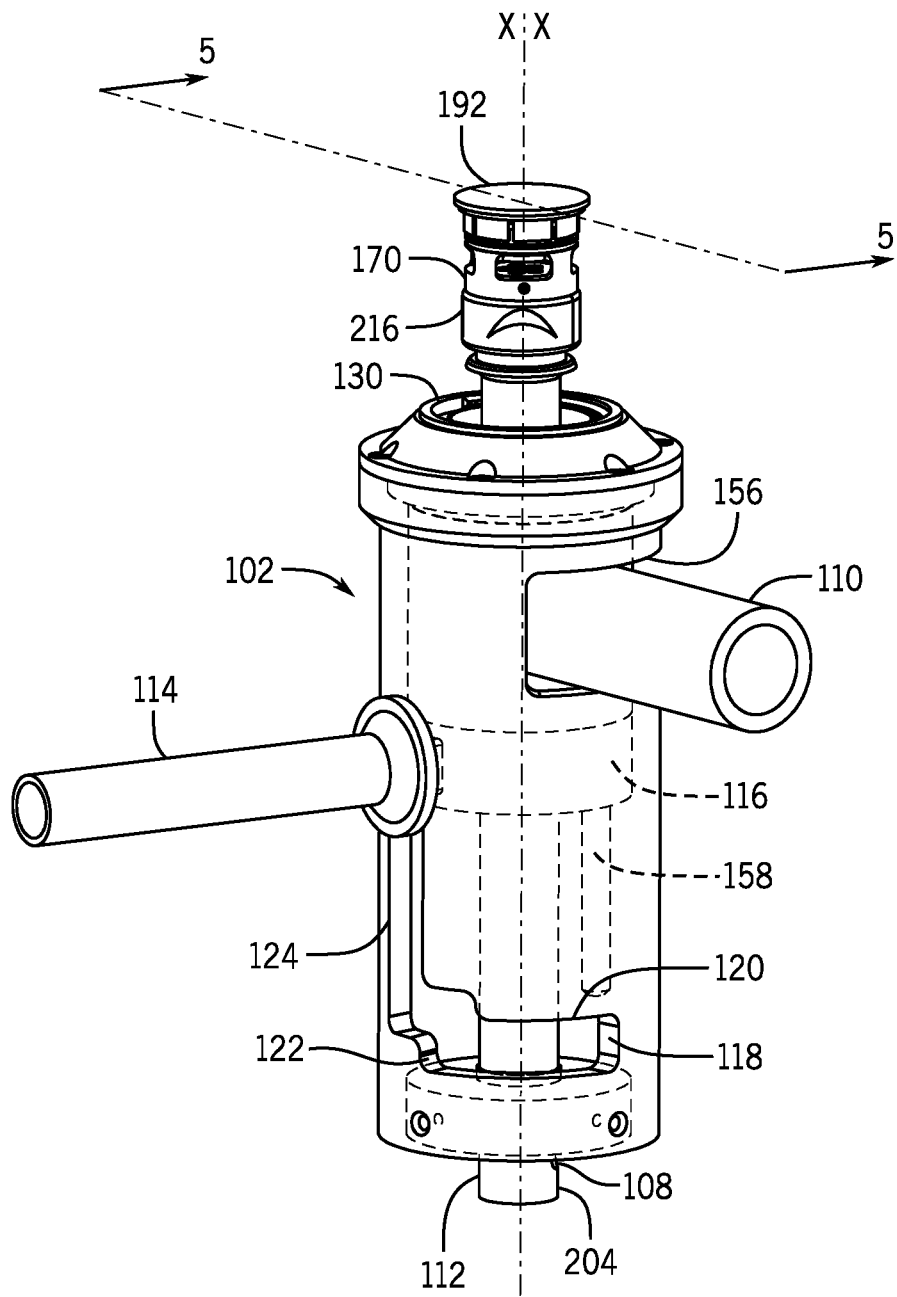
FIG. 4 is a perspective view of the coupler of FIG. 2 in an open position.
Figure 5:
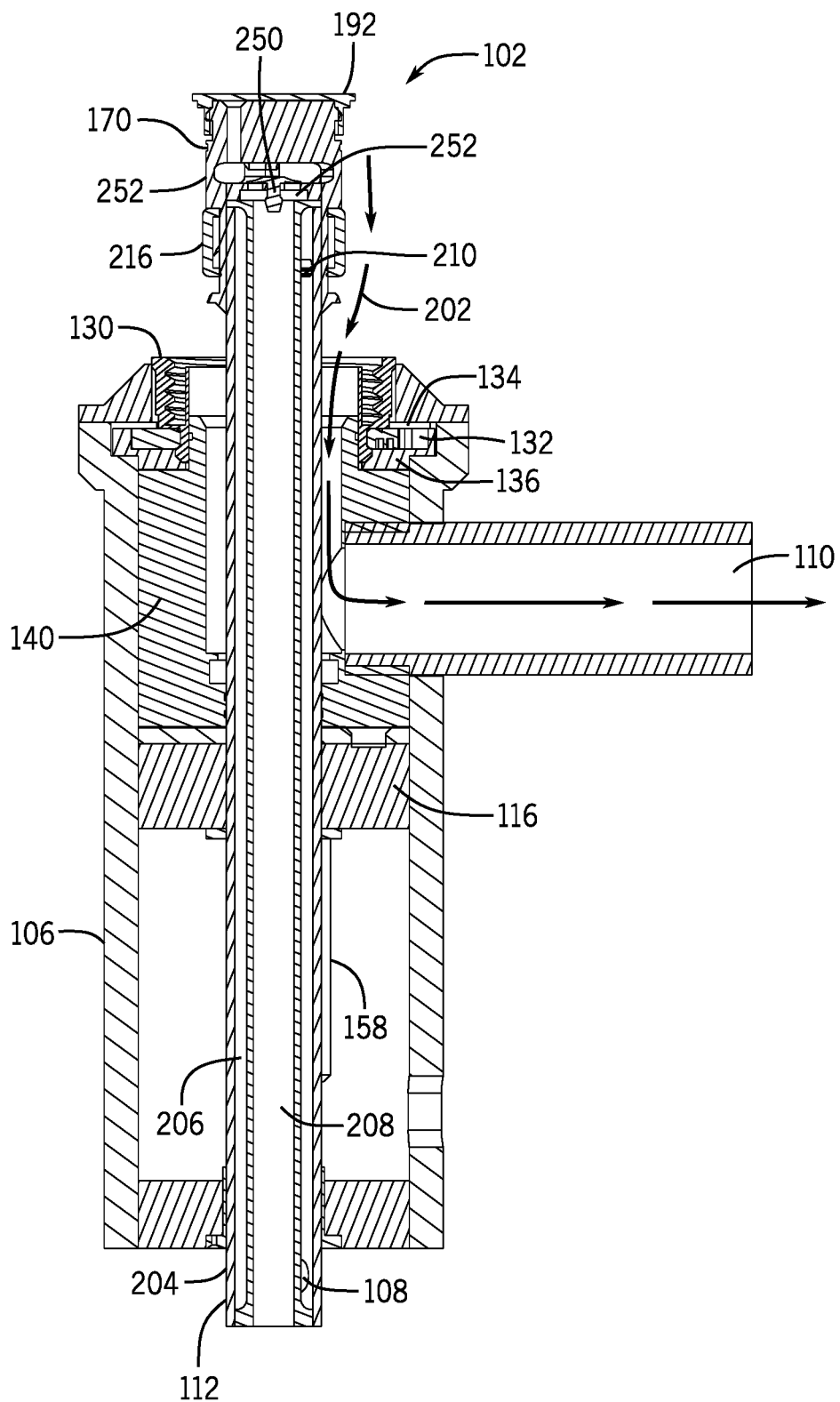
FIG. 5 is a cross-sectional view of the coupler of FIG. 2, taken along line 5-5 in FIG. 4.

With further reference to FIGS. 4 and 5, the probe 112 can be moved relative to the body 106 between a first position (shown in FIGS. 2 and 3) and a second position (shown in FIGS. 1, 4, and 5) along a longitudinal axis X-X. When the probe 112 is in the first position, the probe 112 can be entirely received within the body 106, and the coupler 102 is "closed." The probe 112 is positioned within the fluid path between the container 104 and the outlet 110 to restrict the flow of water or chemicals out of the container 104. To "open" the coupler 102, the probe 112 can be moved to the second position. In the second position, the probe 112 extends upwardly from the body 106 further than in the first position, and can extend at least partially into a container 104 positioned above the coupler 102. When the probe 112 is moved upwardly to the second position, the probe 112 obstructs the flow path between the container 104 and the outlet 110 less, and the contents of the container 104 can flow to the outlet 110.

The probe 112 can be moved between the first position and the second position using a handle 114. The handle 114 can be coupled to the probe 112, and can extend outwardly from the body 106 to be manipulated by a user. In some embodiments, the handle 114 is coupled to a disk 116 that is received around the probe 112 and positioned within the body 106. The handle 114 can be rotated or raised, which in turn causes the disk 116 and probe 112 to rotate or raise. In some embodiments, a slot 118 is formed in the body 106 to restrict the allowable motion of the handle 114 (and probe 112) relative to the body 106. The slot 118 can have both radial components 120 and axial components 122, 124 to transition the probe 112 between the first position and the second position.

Prior to transitioning the probe 112 from the first position to the second position, a container 104 can be secured to the coupler 102. To connect the container 104 to the coupler 102, a cylindrical wall 126 (shown in FIG. 3) can extend downward from a ring-shaped cover 127 coupled to the top of the body 106 to define a recess 128 positioned about the longitudinal axis X-X. The recess 128 can receive a container cap 130, such as, for example, a standard 63 mm screw cap. In some embodiments, the cylindrical wall 126 extends concentrically around the probe 112, which can extend upward into the container cap 130 to access the contents of the container 104.

The cap 130 is preferably locked into place within the recess 128 to avoid any accidental disconnection of the container 104 from the coupler 102. To lock the cap 130 within the recess 128, a cam locking mechanism 132 is positioned within the body 106 beneath the ring-shaped cover 127. In some embodiments, the cam locking mechanism 132 is positioned about the longitudinal axis X-X, and is also approximately concentric with the probe 112. The cam locking mechanism 132 can be movable between a locked position and an unlocked position to releasably couple the cap 130 to the coupler 102.

Figure 7:
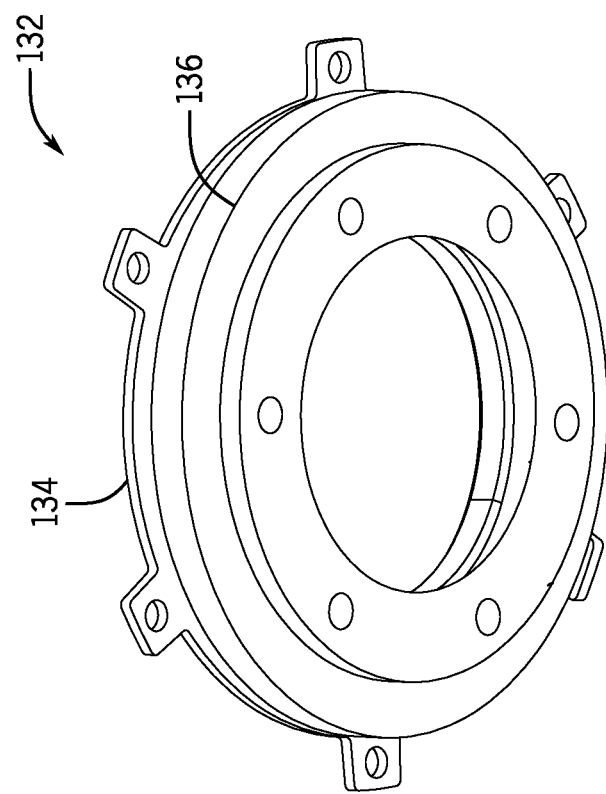
FIG. 7 is a bottom perspective view of the cam locking mechanism of FIG. 6.
Figure 6:
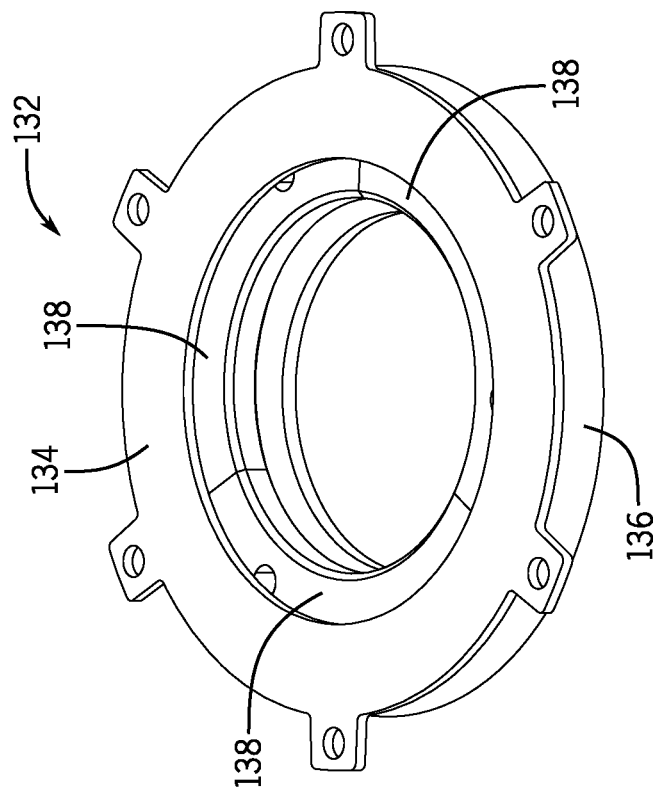
FIG. 6 is a top perspective view of a cam locking mechanism present in the coupler of FIG. 2.

The cam locking mechanism 132 can include a top plate 134 and a bottom plate 136, which can house a plurality of rotatable cams 138, as shown in FIGS. 6 and 7. In some embodiments, the top plate 134 is rotatably engaged with the bottom plate 136, which allows relative rotation between the top plate 134 and the bottom plate 136. The top plate 134 can be coupled to the body 106 (e.g., via fasteners), while the bottom plate 136 can be coupled to an inner housing 140 received within the body 106 and coupled to the outlet 110.

Figure 9:
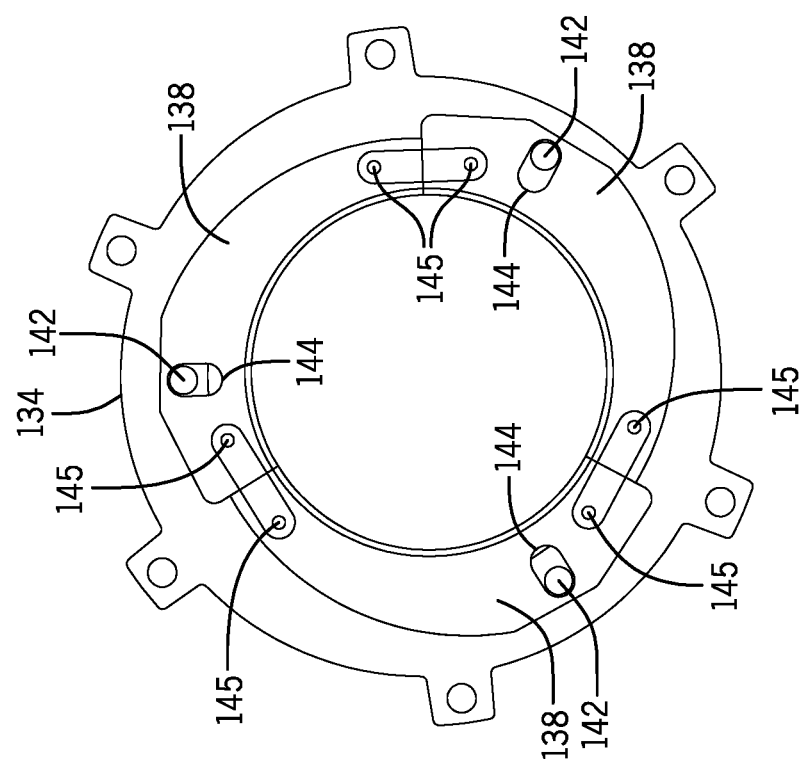
FIG. 9 is a bottom perspective view of the locking mechanism of FIG. 6 with a bottom plate removed.

The rotatable cams 138 can be coupled to the top plate 134 using a plurality of dowel pins 142, shown in FIG. 9. The dowel pins 142 are formed integrally with the top plate 134, and can extend through slots 144 formed in a section of each rotatable cam 138. The slots 144 can have an elongate oval shape that can receive the dowel pin 142, which serves as a pivot point to allow rotation and translation of the cam 138 about the dowel pin 142. In some embodiments, the slots 144 constrain the motion of the cams 138 within the cam locking mechanism 132.

Figure 8:
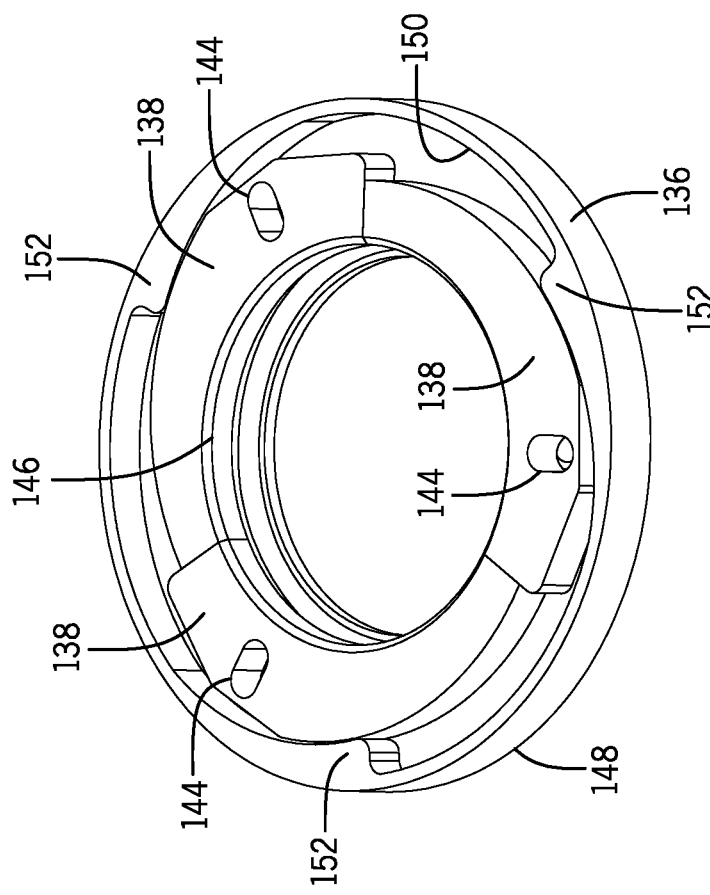
FIG. 8 is a top perspective view of the cam locking mechanism of FIG. 6 with a top plate removed.

The cams 138 can be rotated between an unlocked and locked position by relative rotation between the top plate 134 and the bottom plate 136. As shown in FIG. 8, the plurality of cams 138 form an inner ring 146 within the cam locking mechanism 132. In some embodiments, the cams 138 can be coupled to each other using one or more springs (not shown) coupled to one or more pins 145, shown in FIG. 9. The cams 138 are received within the outer ring 148 formed in the bottom plate 136. The outer ring 148 is defined by a cylindrical wall 150 extending circumferentially around the bottom plate 136. The cylindrical wall 150 has a plurality of projections 152 extending radially inward toward the center of bottom plate 136 from the cylindrical wall 150. In some embodiments, the plurality of projections 152 spiral inwardly in a spiral configuration away from the cylindrical wall 150.

Figure 13:
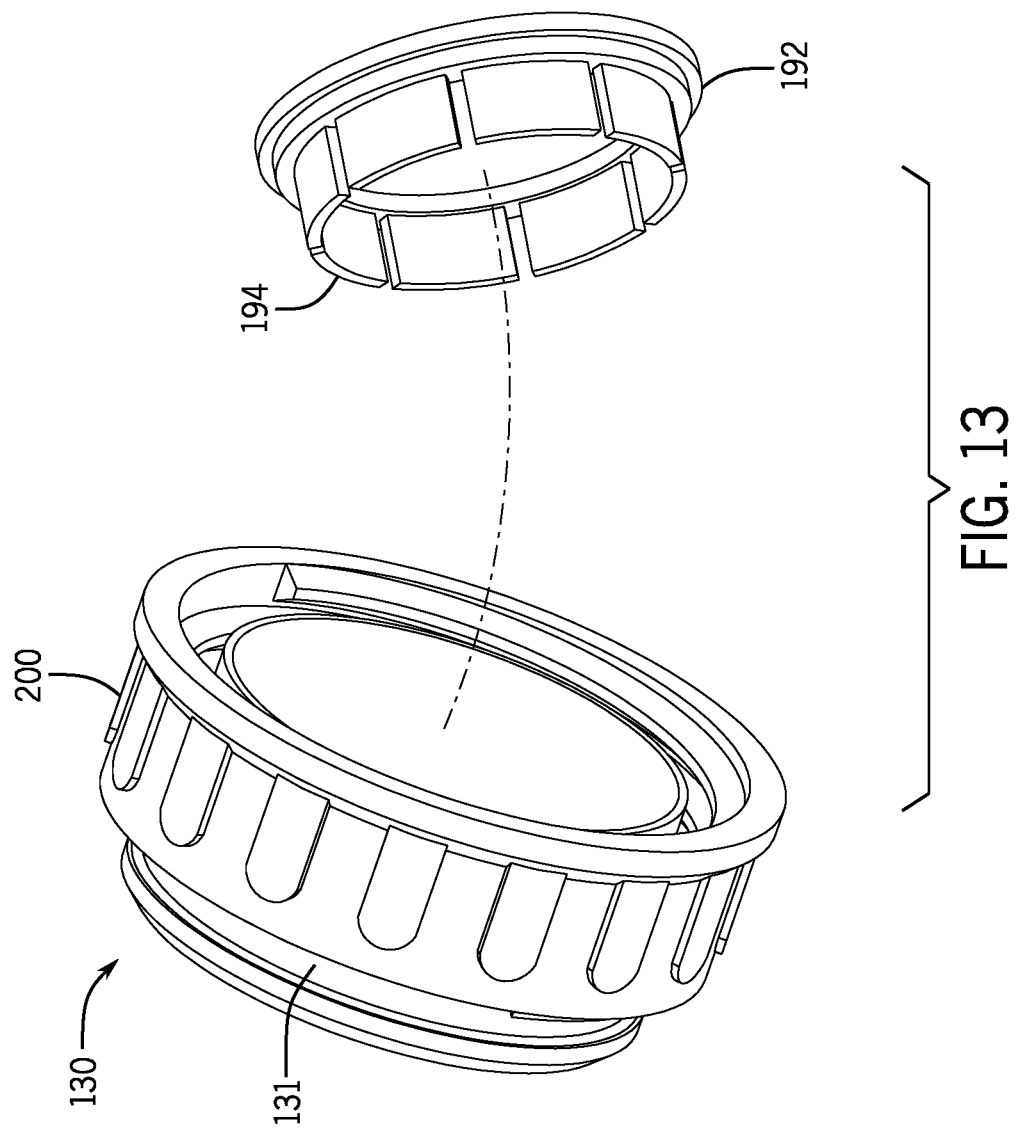
FIG. 13 is a perspective view of a disassembled cap that can be used to couple a container to the coupler of FIG. 2.

The inward spiral of the projections 152 formed in the cylindrical wall 150 and the arcuate shape of the cams 138 combine to produce rotational and translational motion of the cams 138 about the dowel pins 142. As shown in FIG. 8, each cam 138 can be positioned proximate to a projection 152. When the bottom plate 136 is rotated relative to the top plate 134, the bottom plate 136 also rotates relative to the cams 138, which are coupled to the top plate 134. As the bottom plate 136 rotates, the position of the projection 152 relative to the cam 138 changes. For example, when the bottom plate 136 shown in FIG. 8 is rotated clockwise, the projections 152 each rotate closer to the pivot point (i.e., the dowel pin 142) of each cam 138, causing the end of the cam 138 opposite the slot 144 to rotate inward. The inward rotation of the cams 138 causes a diameter of the inner ring 146 to decrease, which then engages an annular channel 131 (shown in FIG. 13) and locks the cap 130 of a container 104 to the cam locking mechanism 132. Relative rotation between the bottom plate 136 and the top plate 134 can also unlock the cam locking mechanism 132. Counterclockwise rotation of the bottom plate 136 relative to the top plate 134 moves the projections 152 away from the pivot point of each cam 138, and allows the inner ring 146 to expand against the biasing of the springs (not shown) to an unlocked diameter larger than the locked diameter. The cap 130 of a container 104 can then be removed from the cam locking mechanism 132. Although the bottom plate 136 has been described as being rotated relative to the top plate 134, the top plate 134 can instead be rotated relative to the bottom plate 136 to produce the same cam 138 rotation between locked and unlocked positions.

Figure 10A:
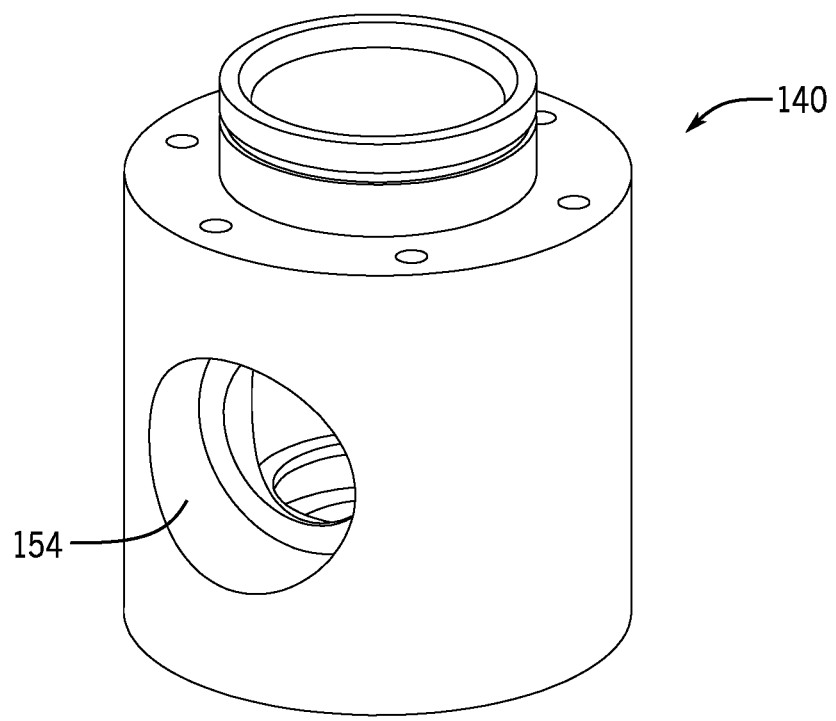
FIG. 10A is a top perspective view of an inner housing present within the coupler of FIG. 2.
Figure 10B:
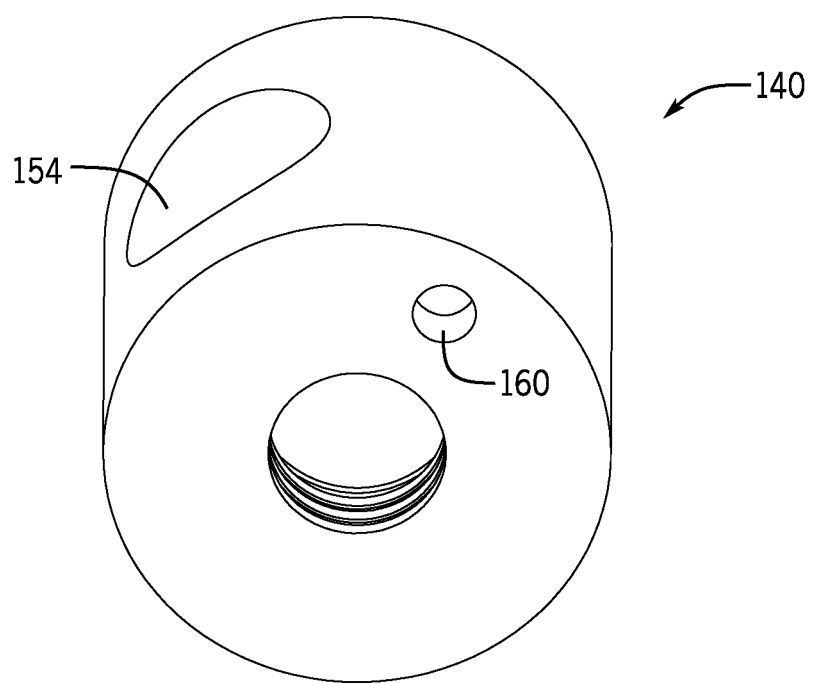
FIG. 10B is a bottom perspective view of the inner housing of FIG. 10A.

FIGS. 10A and 10B show the inner housing 140, which can rotate relative to the body 106 to activate the cam locking mechanism 132. The initial locking of the cam locking mechanism 132 around a cap 130 can be performed by rotating the outlet 110 relative to the body 106, which causes rotation of the inner housing 140 relative to the body 106. The outlet 110, which is coupled to a boss 154 formed in the inner housing 140, extends through a guide 156 (shown in FIG. 1) formed in the body 106. The guide 156 extends circumferentially about a portion of the body 106. For example, the guide 156 can extend about 90 degrees around the body 106 to allow approximately 90 degrees of relative rotation between the outlet 110 and the body 106. Rotation of the outlet 110 (and therefore inner housing 140) within the guide 156 and relative to the body 106 causes rotation of the bottom plate 136 of the cam locking mechanism 132 relative to the top plate 134, which in turn causes the cams 138 to rotate and lock or unlock a cap 130 that may be present within the recess 128.

In order to prevent a user from accessing the contents of a container 104 (and possibly spilling or contacting chemicals) before the container 104 is properly locked to the coupler 102, an interlock mechanism is provided. Specifically, the interlock mechanism can restrict a user from moving the handle 114 upward relative to the body 106 and translating the probe 112 between the first position and the second position unless the cam locking mechanism 132 has been locked around the cap 130 of a container 104.

A locking pin 158 (shown in FIG. 1) is coupled to the inner housing 140, and extends downward away from the inner housing 140 within the body 106. The locking pin 158 can be coupled to a blind hole 160 formed in the inner housing 140. In some embodiments, the locking pin 158 is coupled to the blind hole 160 using an interference fit. Because the locking pin 158 is coupled to the inner housing 140, the locking pin 158 rotates in concert with the outlet 110 (and inner housing 140) when it is rotated relative to the body 106.

Figure 11A:
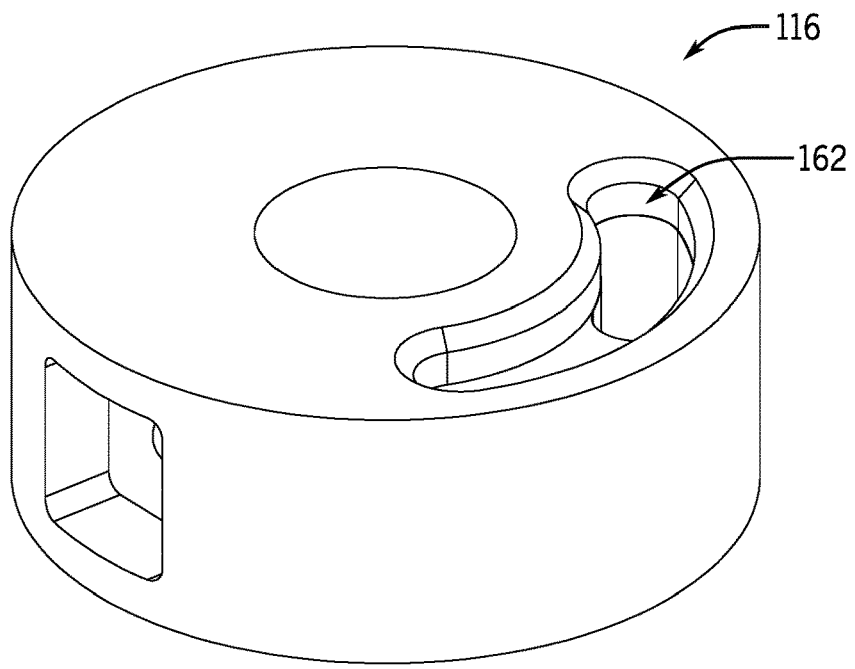
FIG. 11A is a top perspective view of a disk present within the coupler of FIG. 2.
Figure 11B:
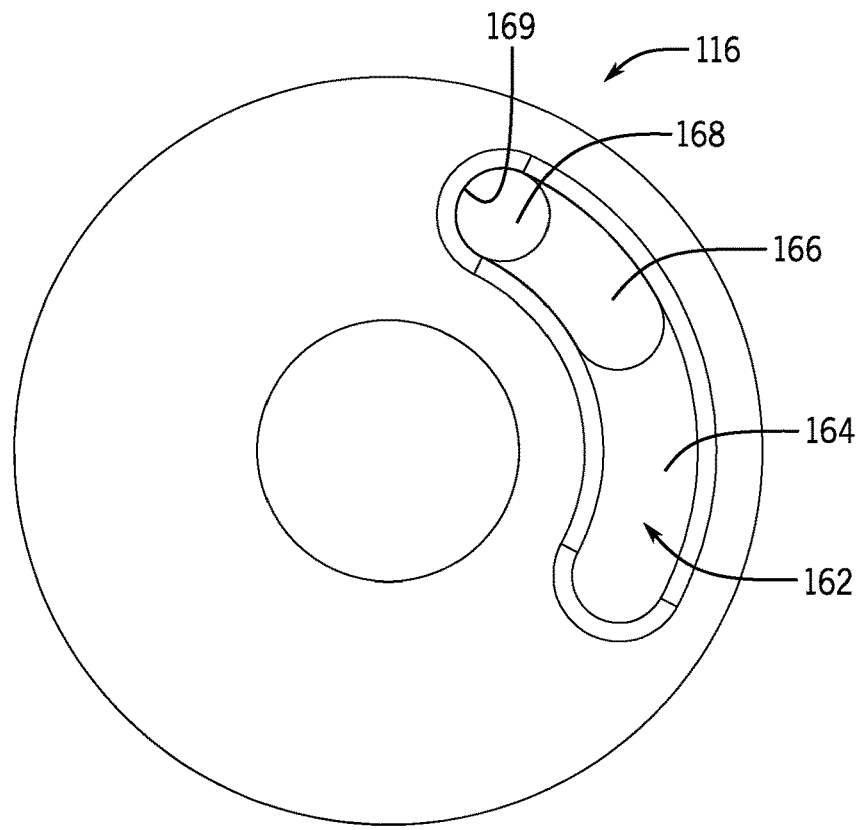
FIG. 11B is a top plan view of the disk of FIG. 11A.

The locking pin 158 is selectively engaged with an arcuate guided track 162 formed in the disk 116, as shown in FIGS. 11A and 11B. The locking pin 158 and the guided track 162 constrain the movement of the handle 114, disk 116, and probe 112 relative to the body 106. The guided track 162 extends into and through a portion of the disk 116, and receives a portion of the locking pin 158 therein. The guided track 162 can be defined by multiple different depths, which can allow the handle 114, disk 116, and probe 112 to translate between multiple different positions relative to the body 106. In some embodiments, the guided track 162 has three sections: a first section 164, a second section 166, and a third section 168. Each section 164, 166, and 168 is formed at a different depth into the disk 116 that corresponds to three different handle 114 positions relative to the body 106 and the slot 118.

Before the outlet 110 is rotated relative to the body 106 to lock the cam locking mechanism 132, the locking pin 158 is aligned within and extends into a portion of the third section 168 of the guided track 162. The third section 168 of the guided track 162 can be a through hole having a diameter approximately equal to the diameter of the locking pin 158. When the locking pin 158 is positioned within the third section 168, the handle 114 may be restricted from rotating from its resting position (e.g., rotated counterclockwise within the radial component 120 of the slot 118). The locking pin 158 can contact an outer surface 169 of the guided track 162, which can restrict clockwise movement of the handle 114 and the disk 116. The radial component 120 of the slot 118 restricts counterclockwise rotation and elevational translation of the handle 114 relative to the body 106, effectively blocking the coupler 102 from being "opened."

Once the outlet 110 and inner housing 140 are rotated relative to the body 106 to lock the cam locking mechanism 132, the locking pin 158 is similarly rotated relative to the disk 116. When the cam locking mechanism 132 has been locked, the locking pin 158 is aligned with and received within the first section 164. The handle 114, disk 116, and probe 112 can be first rotated relative to the body 106. The rotation of the handle, disk 116, and probe 112 is constrained by the locking pin 158 and the first section 164 of the guided track 162, as well as the radial component 120 of the slot 118. Once the handle 114 has reached the first axial component 122 of the slot 118, the locking pin 158 is aligned with and received within the second section 166 of the guided track 162, which has a depth greater than the first section 164. The handle 114 can again be further urged radially and axially within the slot 118, until the second axial component 124 of the slot 118 is reached. At this location, the locking pin 158 is aligned within the third section 168, which extends entirely through the disk 116. The handle 114 can then be urged upwardly within the second axial component 124 of the slot 118 to then raise the handle 114, disk 116, and probe 112 relative to the body 106. The locking pin 158 extends through the third section 168 of the guided track 162, and friction between the locking pin 158 and the third section 168 of the guided track 162 can provide some resistance to movement of the handle 114, the disk 116, and the probe 112 when in the elevated position. When the handle 114 is raised, the probe 112 is in the second position and the coupler 102 is "open."

Figure 12B:
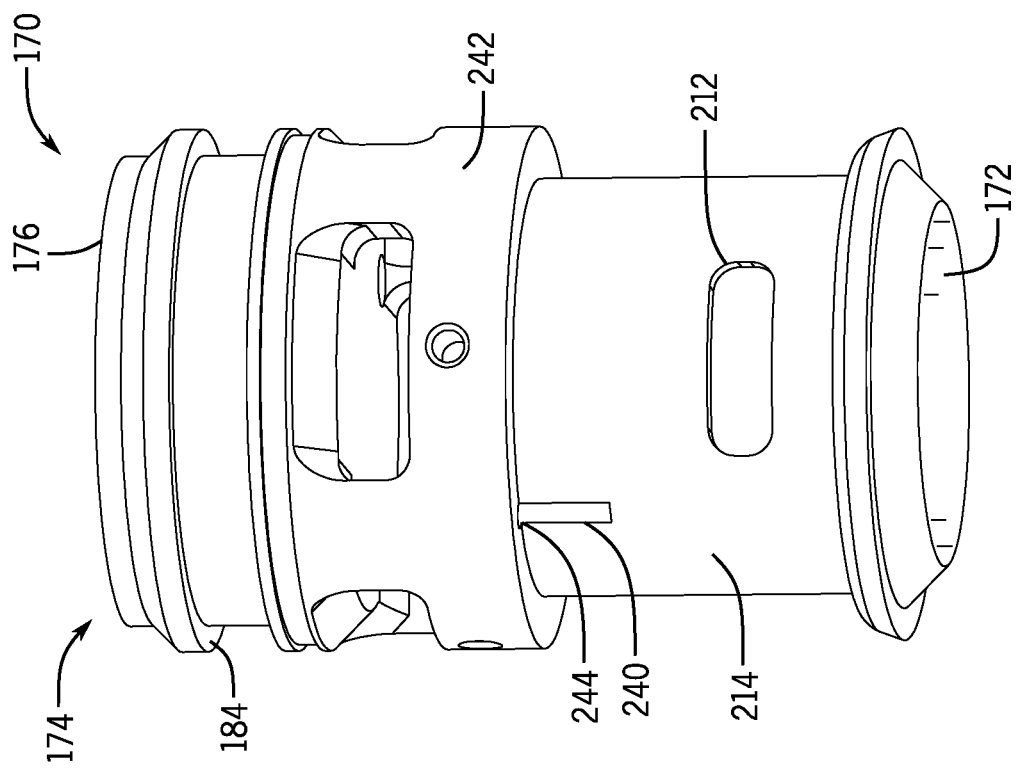
FIG. 12B is a bottom perspective view of the probe tip of FIG. 12A.
Figure 12A:
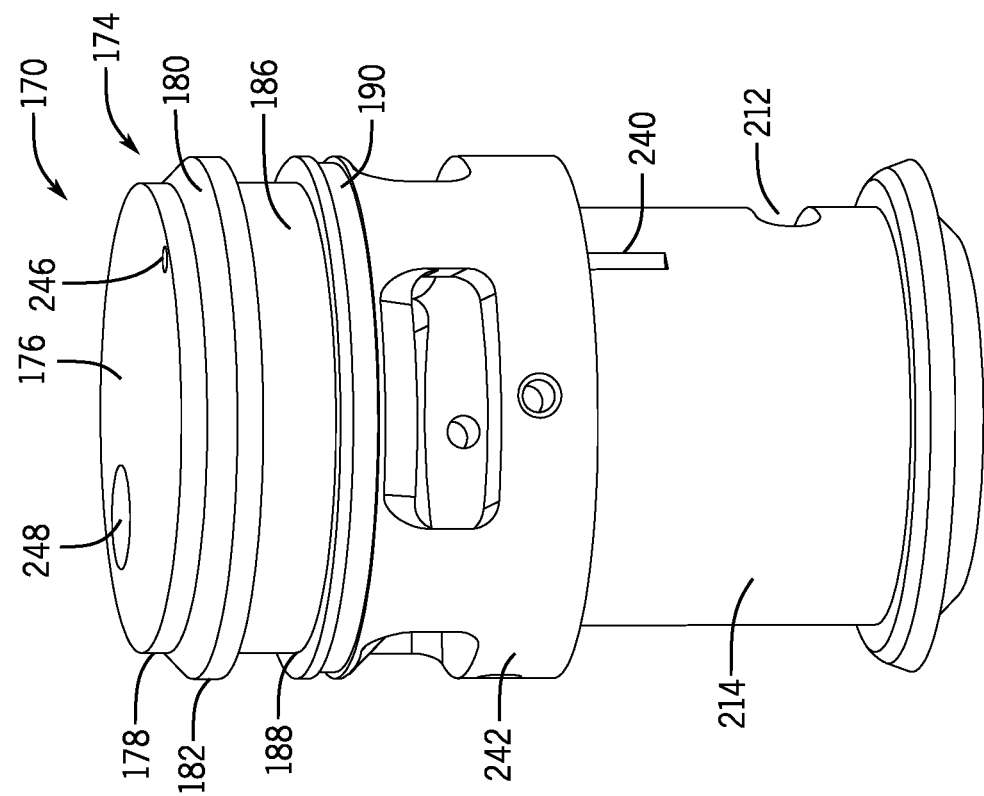
FIG. 12A is a top perspective view of a probe tip present within the coupler of FIG. 2.

FIGS. 12A and 12B show a probe tip 170 that can be coupled to an end of the probe 112 opposite the inlet 108. The probe tip 170 defines a cylindrical bore 172 that receives the end of the probe 112 opposite the inlet 108. When the probe 112 is in the first position, the probe tip 170 can be received within the body 106 and the recess 128. When the probe 112 is transitioned to the second position, the probe tip 170 can extend outwardly beyond the body 106, and can extend into a container 104 that is locked to the coupler 102.

The probe tip 170 has a seal engaging section 174 that engages and displaces a plug (e.g., the plug 192, shown in FIG. 13) of the cap 130 to allow access to the contents of a container 104. The seal engaging section 174 has a top surface 176 and a first cylindrical wall 178 extending away from and defining the outer perimeter of the top surface 176. A tapered section 180 extends outwardly and downwardly away from the first cylindrical wall 178, toward a second cylindrical wall 182. The second cylindrical wall 182 extends downward from the tapered section 180 toward a shoulder 184 facing opposite the top surface 176. A third cylindrical wall 186 extends away from the shoulder 184, toward a step 188 facing opposite the shoulder 184. A sealing groove 190 can be formed in the step 188, and can receive an O-ring or other type of seal.

Figure 14A:
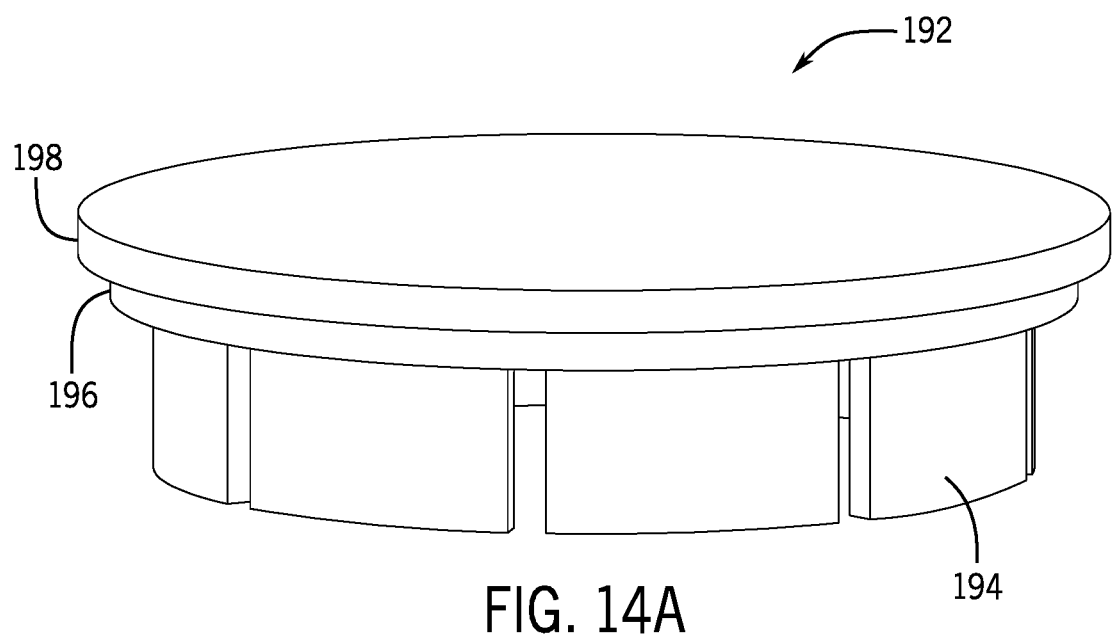
FIG. 14A is a top perspective view of a plug that can be coupled to the cap of FIG. 13.
Figure 14B:
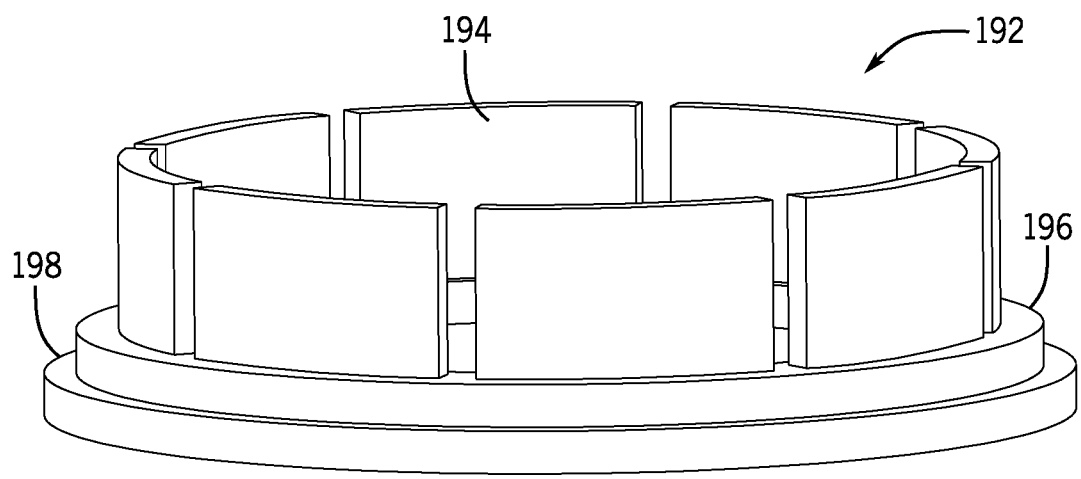
FIG. 14B is a bottom perspective view of the plug of FIG. 14A.

When the coupler 102 transitions from closed to open, the probe 112 and probe tip 170 are urged upward relative to the body 106 and the cap 130, which is locked within the cam locking mechanism 132. The seal engaging section 174 is urged upward into the cap 130, where it contacts the plug 192 positioned within the cap 130, shown in FIGS. 13, 14A, and 14B. The plug 192 includes flexible tabs 194 extending away from a first plug seat 196 and a second plug seat 198.

As the seal engaging section 174 of the probe tip 170 is being urged upward into the cap 130, the flexible tabs 194 rotate radially inward to release the plug 192 from a threaded portion 200 of the cap 130. The flexible tabs 194 can then engage the second cylindrical wall 182 of the probe tip 170 to releasably couple the plug 192 to the probe tip 170. The plug 192 can then be displaced upwardly away from the threaded portion 200 of the cap 130 into the container 104, which removes the seal between the coupler 102 and container 104, and opens a fluid flow path 202 between the container 104 and the outlet 110, as shown in FIG. 5. The contents of the container 104 can then be accessed by and removed through the coupler 102.

To return the plug 192 to the threaded portion 200 of the cap 130 and restore the seal between the container 104 and coupler 102, the probe 112 and the probe tip 170 can be lowered using the handle 114. When the probe tip 170 is lowered relative to the body 106 and the cap 130, the first plug seat 196 and second plug seat 198 can compressively engage the threaded portion 200 of the plug 192. As the probe tip 170 is lowered further, the flexible tabs 194 of the plug rotate outward to release the seal engaging section 174 of the probe tip and reengage with the threaded portion 200 of the cap 130. In some embodiments, the flexible tabs 194 have barbs (not shown) extending inward and outward from the tabs 194 to releasably couple the plug 192 to both the threaded portion 200 of the cap 130 and to the shoulder 184 and second cylindrical wall 182 of the probe tip, depending on the position of the probe tip 170 relative to the plug 192. When the tabs 194 reengage the threaded portion 200 of the plug 192, a fluidic seal is reestablished between the coupler 102 and the container 104.

After the contents of the container 104 are accessed by the coupler 102, the closed transfer system 100 can be rinsed. In some embodiments, the rinsing process includes rinsing the interior of the container 104, as well as the cap plug 192 and the probe tip 170. However, if the container 104 is not empty, the rinsing process may include only rinsing the cap plug 192 and the probe tip 170.

Figure 15A:
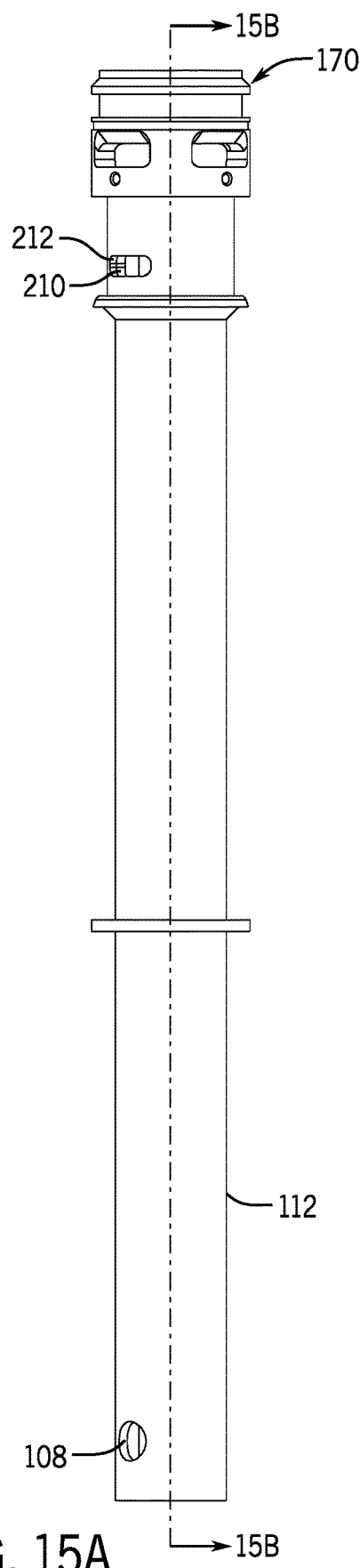
FIG. 15A is a front view of a probe and probe tip assembly present within the coupler of FIG. 2.

To perform the rinsing process, the coupler 102 is placed in communication with a water source (not shown). In some embodiments, the water source is coupled to the inlet 108, which can be formed as a hole extending through an outer wall 204 of the probe 112, shown in FIG. 15A. Rinse water is received through the inlet 108, which then fills and flows upwardly through an annular chamber 206 formed within the probe 112. The annular chamber 206 can be formed of stainless steel, and can be defined by the outer wall 204 of the probe 112 and an air tube 208 received within the probe 112. In some embodiments, the air tube 208 and outer wall 204 are positioned concentrically about the longitudinal axis X-X.

Rinse water continues to travel upward in the annular chamber 206 until it reaches a first rinse water outlet 210. The first rinse water outlet 210 can be a slot extending through the outer wall 204 of the probe 112, which allows water to exit the annular chamber 206 and the probe 112 to an external environment. In some embodiments, the first rinse water outlet 210 is aligned with a second rinse water outlet 212 formed through a rinsing section 214 of the probe tip 170, as shown in FIGS. 12A and 12B. During the assembly of the coupler 102, the rinse water outlet 210 and the second rinse water outlet 212 can be used to align the probe tip 170 properly with the probe 112.

Figure 16A:
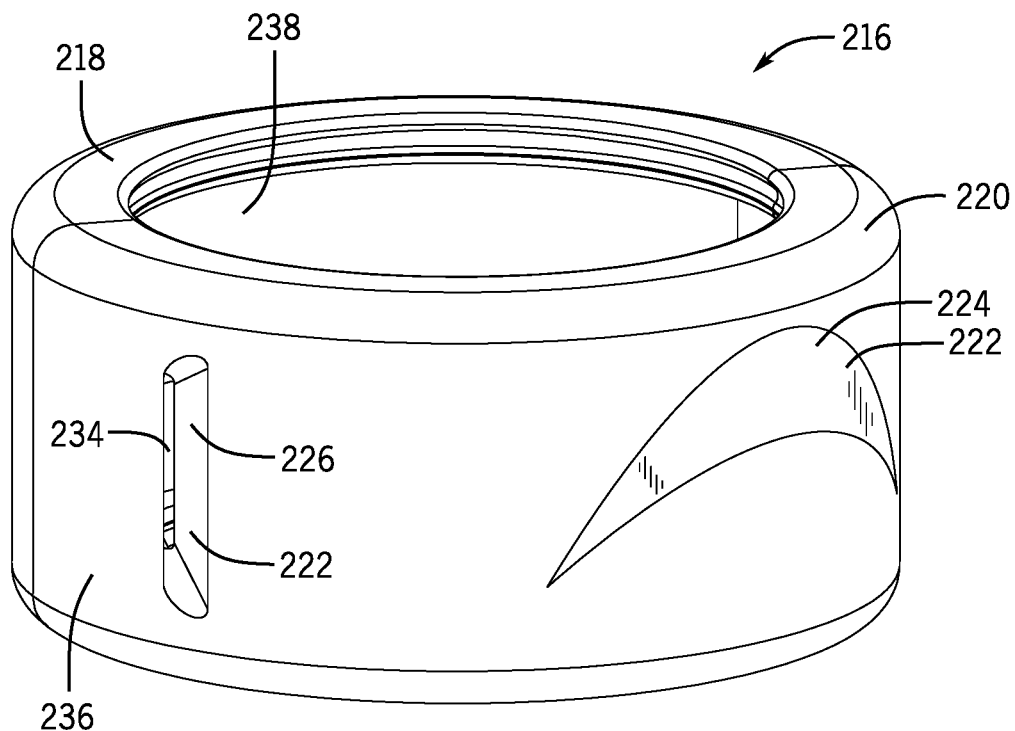
FIG. 16A is a top perspective view of a rotatable rinse head present within the coupler of FIG. 2.
Figure 16B:
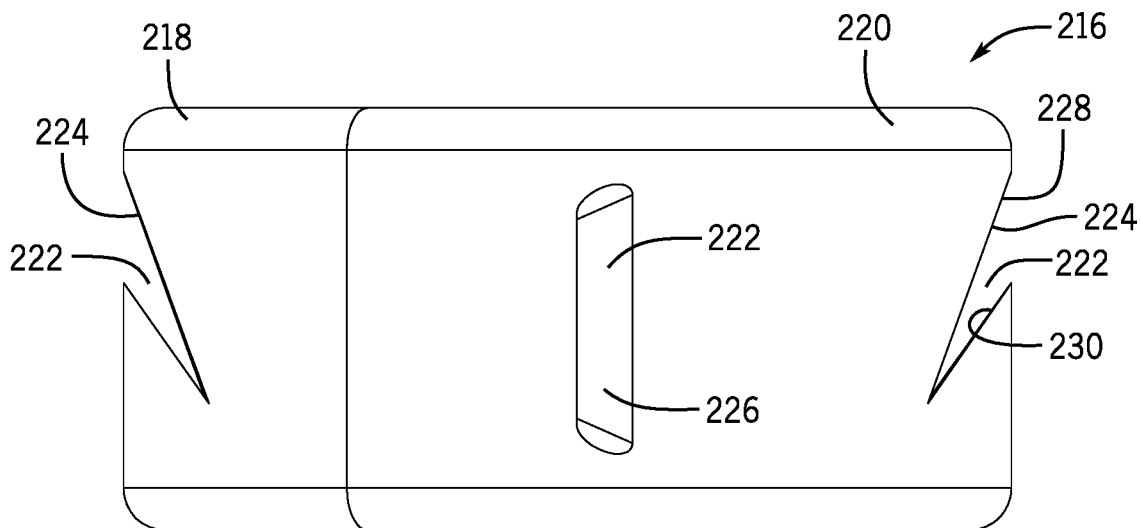
FIG. 16B is a front view of the rotatable rinse head of FIG. 16A.

A rotating rinse head 216, shown in FIGS. 16A and 16B, can be received around a portion of the probe tip 170. In some embodiments, the rotating rinse head 216 is rotatably coupled to the rinsing section 214 of the probe tip 170 and can distribute rinse water exiting the rinse water outlets 210, 212. The rotating rinse head 216 can be divided into two semi-annular components 218, 220, which can be coupled together around the rinsing section 214 using dowel pins (not shown). The rotating rinse head 216 can rotate 360 degrees relative to the probe 112.

Figure 17A:
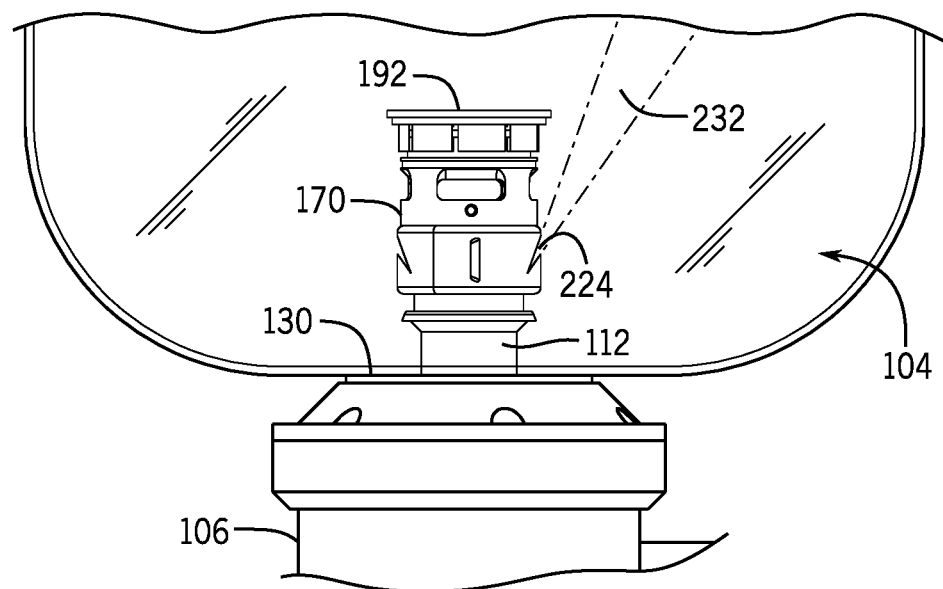
FIG. 17A is a front view of the closed transfer system of FIG. 1 that demonstrates a rinse water flow pattern.

The rotating rinse head 216 distributes water in multiple directions by employing one or more different vanes 222, which extend through a portion of the rotating rinse head 216. For example, the rotating rinse head 216 can include axial vanes 224 and radial vanes 226. The axial vanes 224 can be defined by two parabolic walls 228, 230 angling upwardly away from one another to direct rinse water upward. When rinse water contacts the axial vanes 224, it is directed away from the probe 112 to rinse or clean the surfaces of the container 104 positioned above the probe tip 170. In some embodiments, the axial vanes 224 produce a flow pattern similar to the flow pattern 232 shown in FIG. 17A.

Figure 17B:
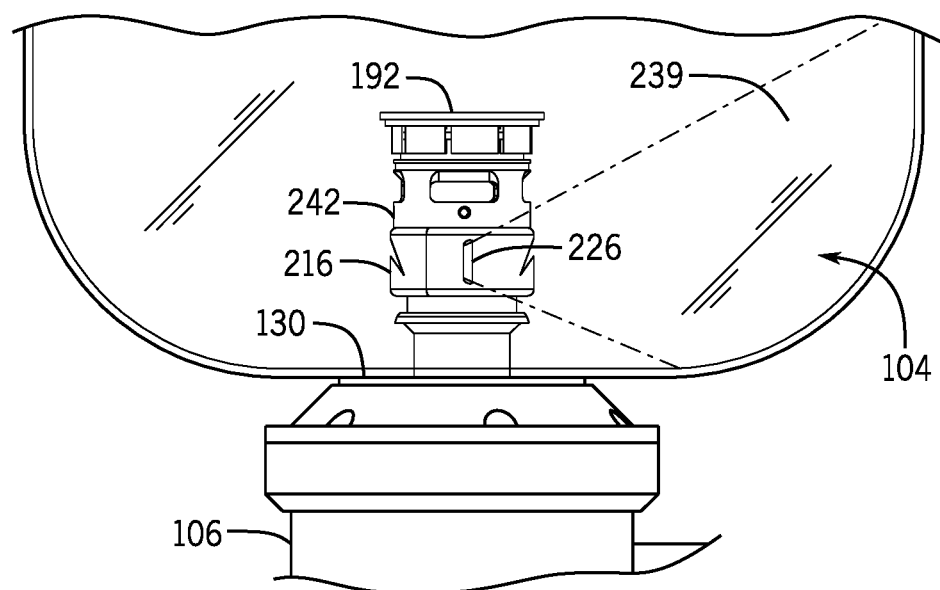
FIG. 17B is a front view of the closed transfer system of FIG. 1 that demonstrates a second rinse water flow pattern.

The radial vanes 226 can form a diffuser that directs water radially outward, upward, and downward from the rotating rinse head 216. In some embodiments, the radial vanes 226 are formed as channels 234 extending from an outer surface 236 of the rotating rinse head 216 through the inner surface 238 of the rotating rinse head 216. The channels 234 can extend outwardly from the inner surface 238 to form a flow path approximately tangent to the inner surface 238 of the rotating rinse head. The radial vanes 226 can produce the flow pattern 239 shown in FIG. 17B, which causes the rotating rinse head 216 to rotate relative to the probe tip 170. In some embodiments, two radial vanes 226 are positioned opposite of one another in the rotating rinse head 216 and together create a couple (i.e., two parallel forces approximately equal in magnitude) that causes the rotating rinse head 216 to spin about the probe tip 170 when the container 104 is being rinsed. As the rotating rinse head 216 spins 360 degrees about the probe tip 170, desirable broad coverage of the surfaces of the container 104 can be contacted by rinse water to flush the system.

Figure 18:
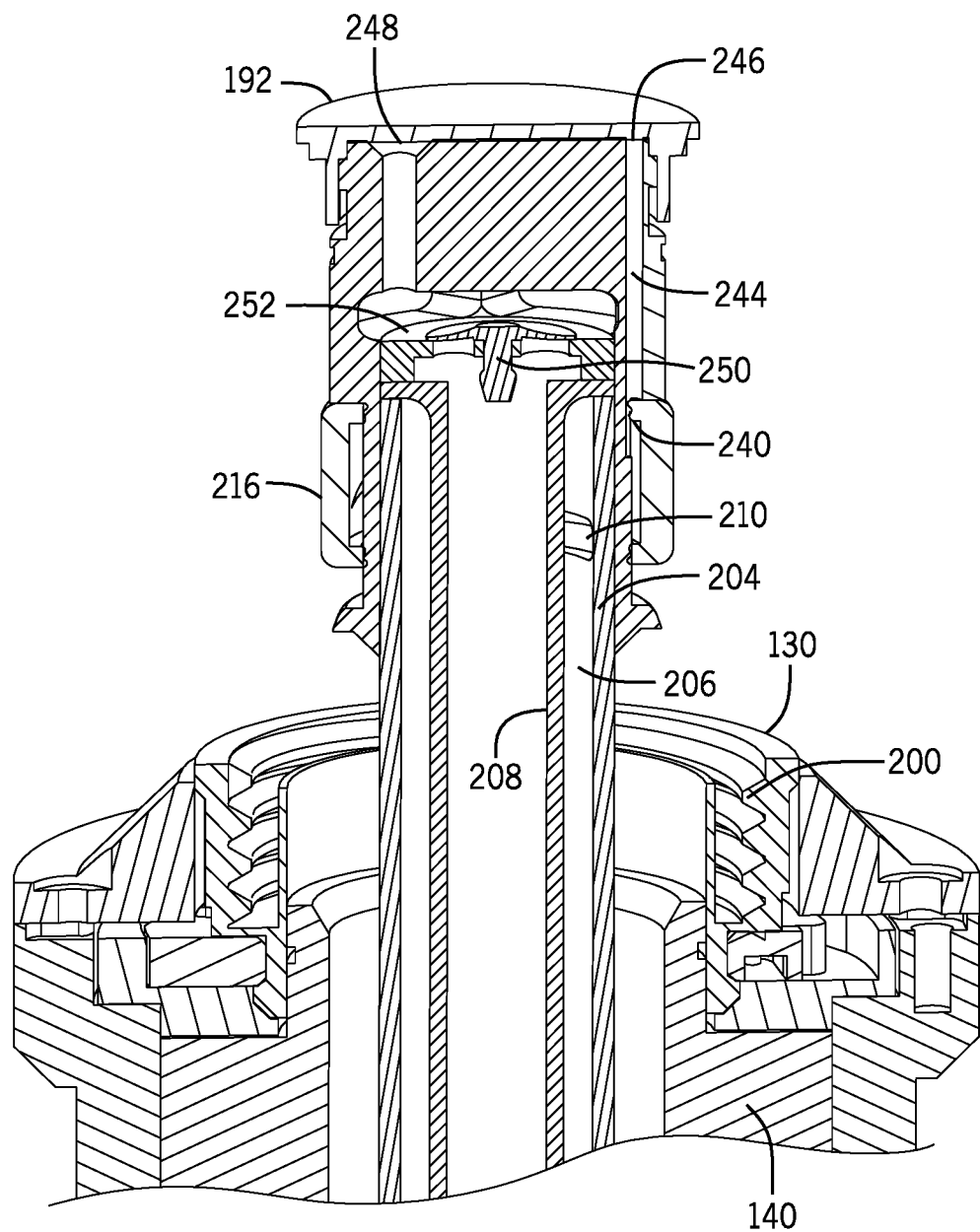
FIG. 18 is a partial cross-sectional view of the coupler of FIG. 2.

As indicated previously, the plug 192 and probe tip 170 can also be rinsed. In some embodiments, the probe 112 is first removed from the container 104 by lowering the handle 114, so that the plug 192 is recoupled to the threaded portion 200 of the cap 130. Rinse water can again be supplied through the inlet 108 in the probe 112, and can pass through the annular chamber 206 and out of the first and second rinse water outlets 210, 212. If the rotating rinse head 216 is contained within the inner housing 140 when the probe 112 is lowered, water can also fill the rotating rinse head 216. A groove 240, shown in FIG. 12A, is formed within the rinsing section 214 of the probe tip 170, which extends upwardly toward the draining section 242 of the probe tip 170. A rinse water passage 244, shown in FIGS. 12A, 12B and 18, is formed in the draining section 242, and extends upward through the seal engaging section 174 to form a cap rinse outlet 246 formed in the top surface 176. Together, the groove 240 and the rinse water passage 244 can direct water from the rinse water outlets 210, 212 upward through the probe tip 170 and out of the cap rinse outlet 246 to contact and rinse the top surface 176 of the probe tip 170 and the first plug seat 196 and second plug seat 198.

A drain passage 248 can be formed through the seal engaging section 174 of the probe tip 170 to drain rinse water present between the plug 192 and the top surface 176. In some embodiments, the drain passage 248 is a countersunk hole extending from the top surface 176 of the probe tip 170 downward through the seal engaging section 174, as shown in FIG. 18. The drain passage 248 can be defined by a diameter larger than the diameter defining the rinse water passage 244. In some embodiments, the drain passage 248 directs rinse water downward onto an umbrella valve 250 seated on a grate 252 that is positioned within the rinsing section 214 of the probe tip 170.

Figure 15B:
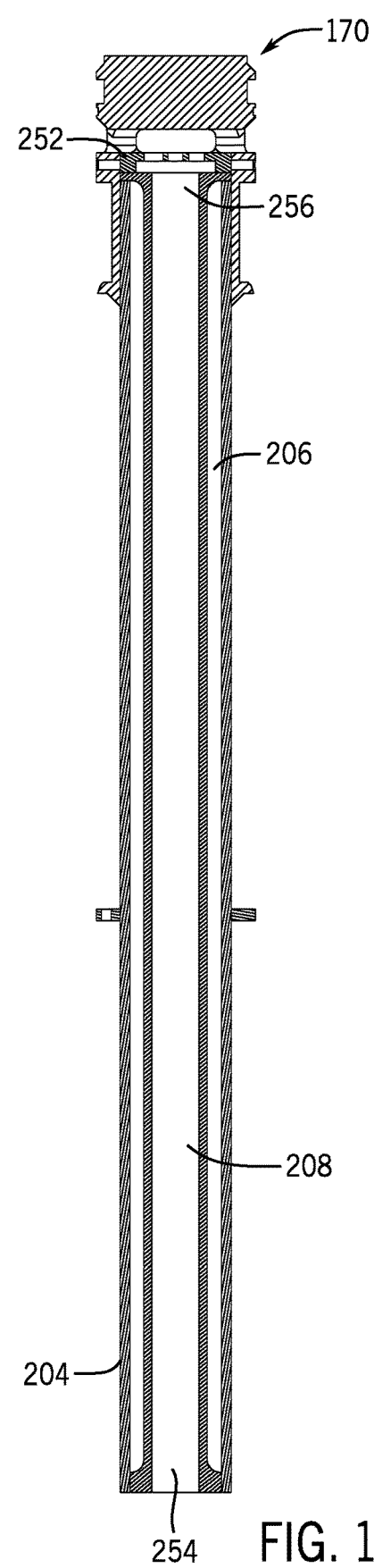
FIG. 15B is a cross-section view of the probe and probe tip assembly of FIG. 15A, taken along lines 15B-15B.

In addition to providing rinse water, the probe 112 can also provide air into the container 104, which aids the flow of liquid out of the container 104 to the outlet 110. As shown in FIG. 15B, the probe 112 includes an air tube 208 positioned concentrically within the outer wall 204. In some embodiments, an inlet 254 is formed at the bottom of the air tube 208 to supply ambient air from the environment. The air travels up the air tube 208, toward an outlet 256. Air can then exit the outlet 256, upward toward the grate 252.

Figure 19A:
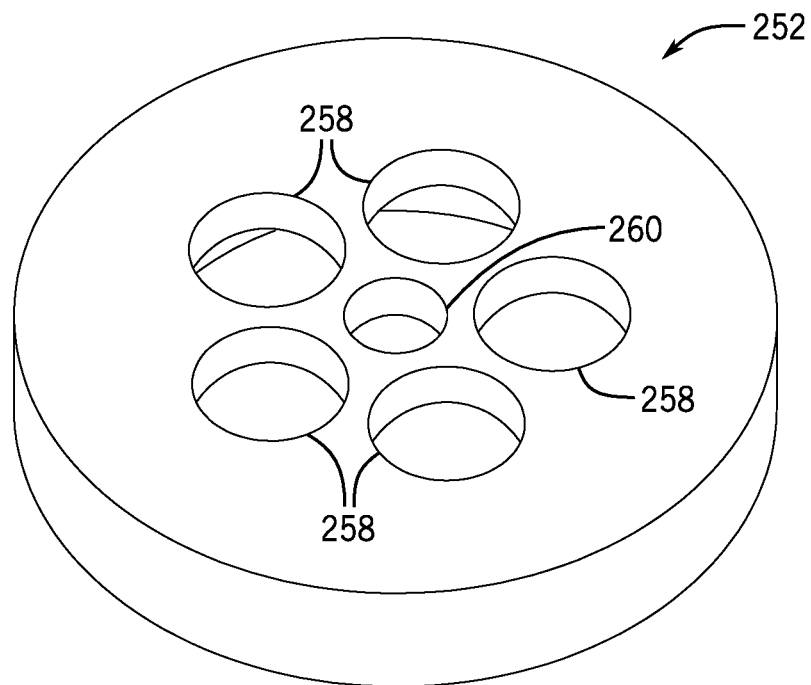
FIG. 19A is a top perspective view of a grate that is present within the coupler of FIG. 2.
Figure 19B:
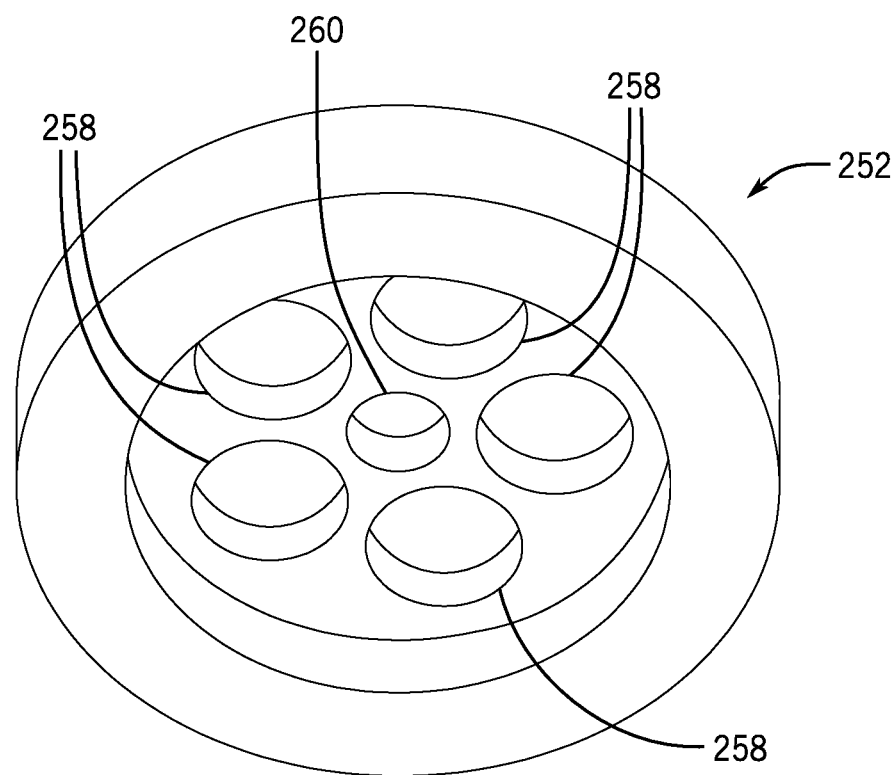
FIG. 19B is a bottom perspective view of the grate of FIG. 19A.

As shown in FIGS. 18, 19A, and 19B, the grate 252 has a disk-like shape. The grate 252 can be received within the cylindrical bore 172 of the probe tip 170, and can rest above the probe 112. One or more holes 258 can be formed in the grate 252, which can extend through the grate 252 to allow air from the air tube 208 to be released. A center hole 260 can be positioned at the center of the grate 252 to receive the stem of an umbrella valve 250. The umbrella valve 250 acts as a check valve, and can selectively allow air into the container 104 while the contents (e.g., chemicals) of the container are being removed through the outlet 110. When the pressure differential between the air within the air tube 208 (which is approximately atmospheric) and the fluid within the container 104 crosses a threshold value, air is sucked upward through the air tube 208. The pressure differential causes the resilient elastomeric material of the umbrella valve 250 to flex upward, uncovering the holes 258 in the grate 252. Air can then pass through the holes 258 to join the container 104, which allows a steady and uninterrupted flow of liquid out of the container 104.

FIGS. 20A-20D show a second embodiment of a probe 262 that can be used in the closed transfer system 100 and coupler 102. The probe 262 can have a generally cylindrical shape. The probe 262 can have a tip 264 integrally molded with the probe body 266. The probe 262 has three walls 268, 270, 272 extending outward from a longitudinal axis Y-Y of the probe 262. The three walls 268, 270, 272 define three separate chambers 274, 276, 278 for supplying air and rinse water to various parts of the coupler 102 and container 104. In some embodiments, the first chamber 274 is supplied with rinse water, while the second and third chambers 276, 278 are supplied with air. A rinse head outlet 280 can be formed through the probe body 266, which supplies rinse water from the first chamber 274 to the rotating rinse head 216 coupled to the probe 262. Passages 282 can be formed in a top surface 284 of the probe 262, and can allow rinse water from the first chamber 274 to pass upward beyond the rinse head outlet 280 to supply rinse water between the cap 130 and the top surface 284 of the probe 262. In some embodiments, an umbrella valve (not shown) is used to selectively allow air to escape from the second and third chambers 276, 278.

Figure 21:
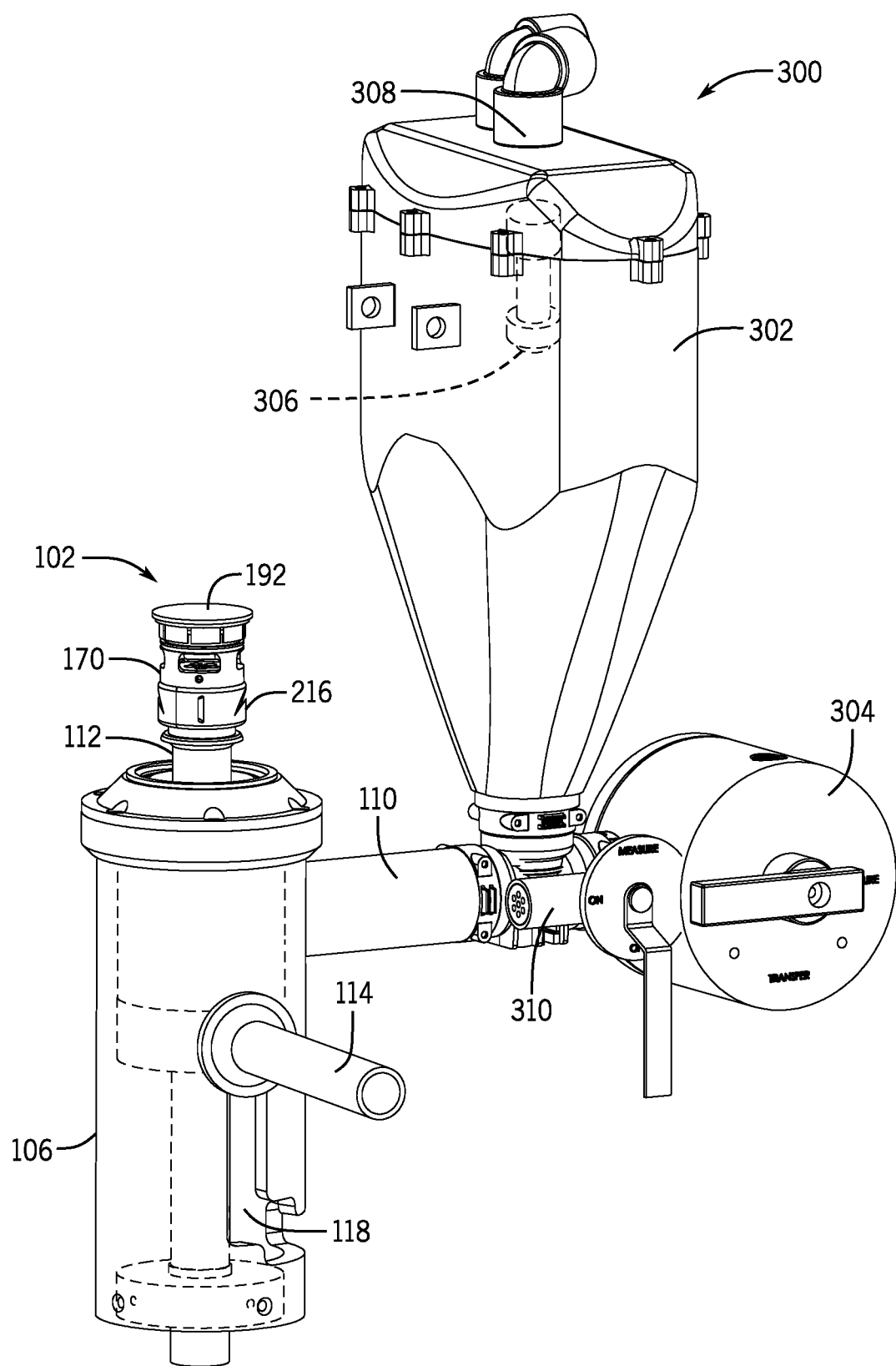
FIG. 21 is a perspective view of a liquid measuring system according to one embodiment.
Figure 22:
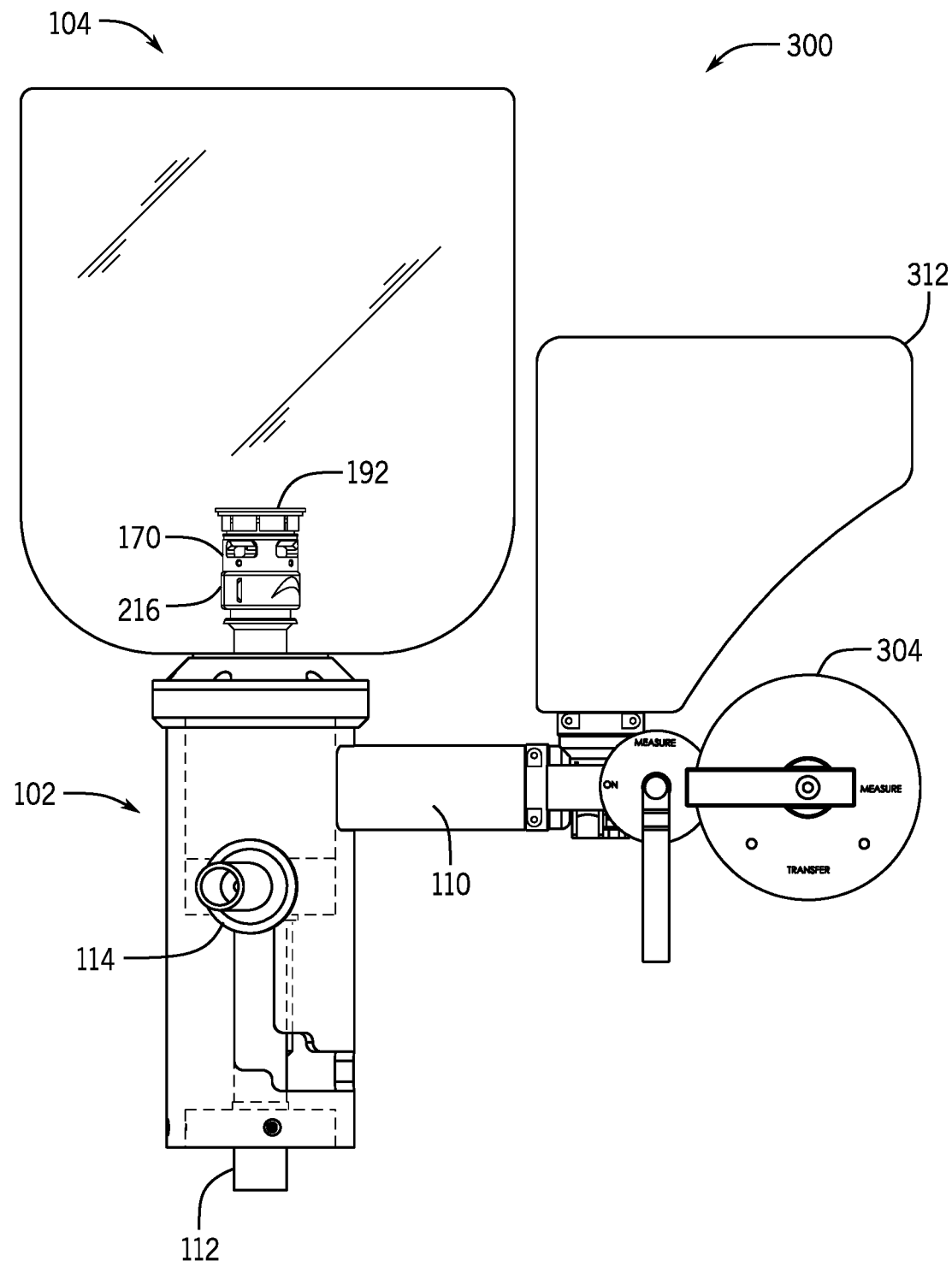
FIG. 22 is a perspective view of a liquid measuring system according to one embodiment.
Figure 23:
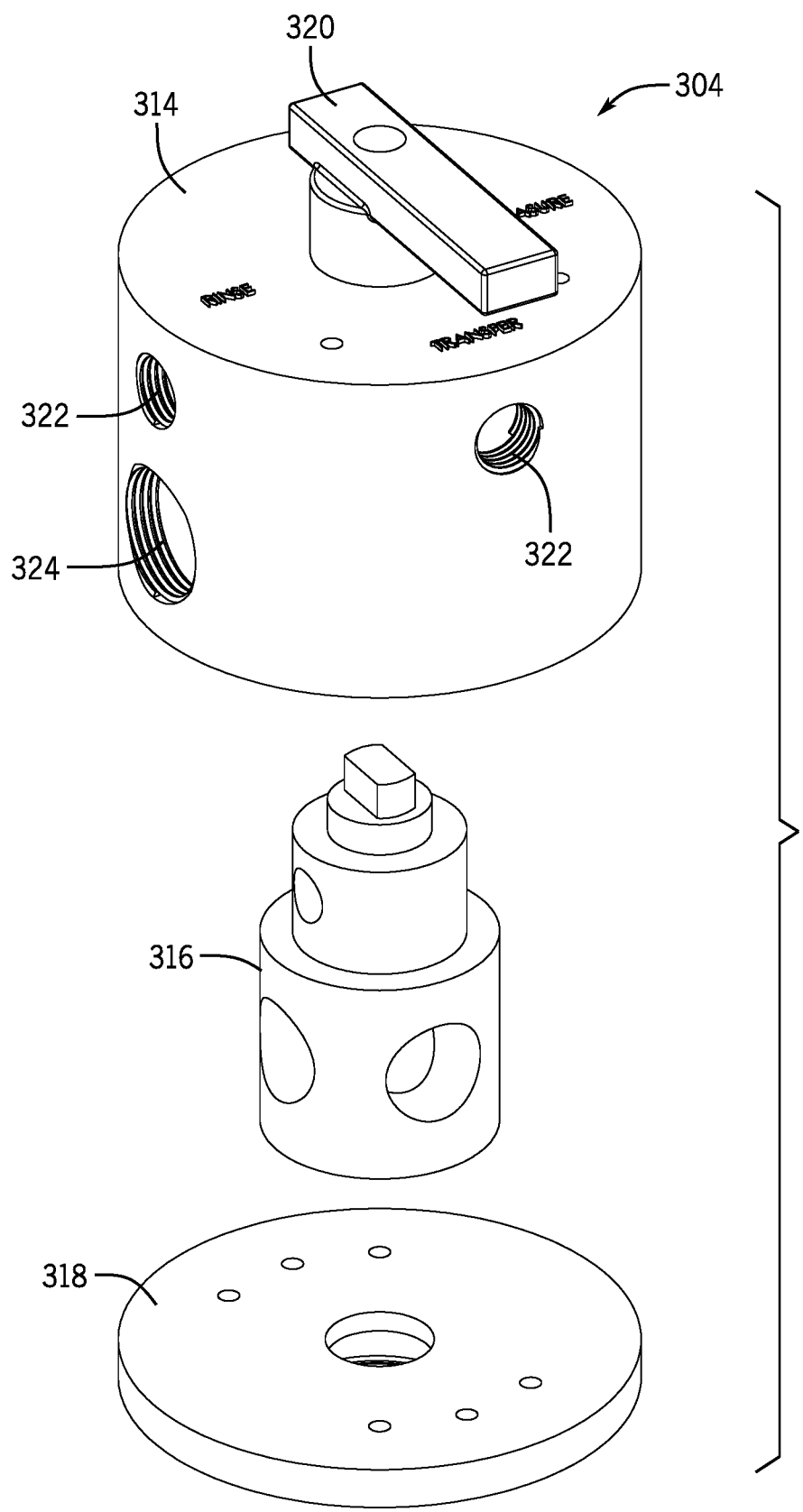
FIG. 23 is an exploded view of a multi-position valve present in the liquid measuring system of FIG. 21.
Figure 24B:
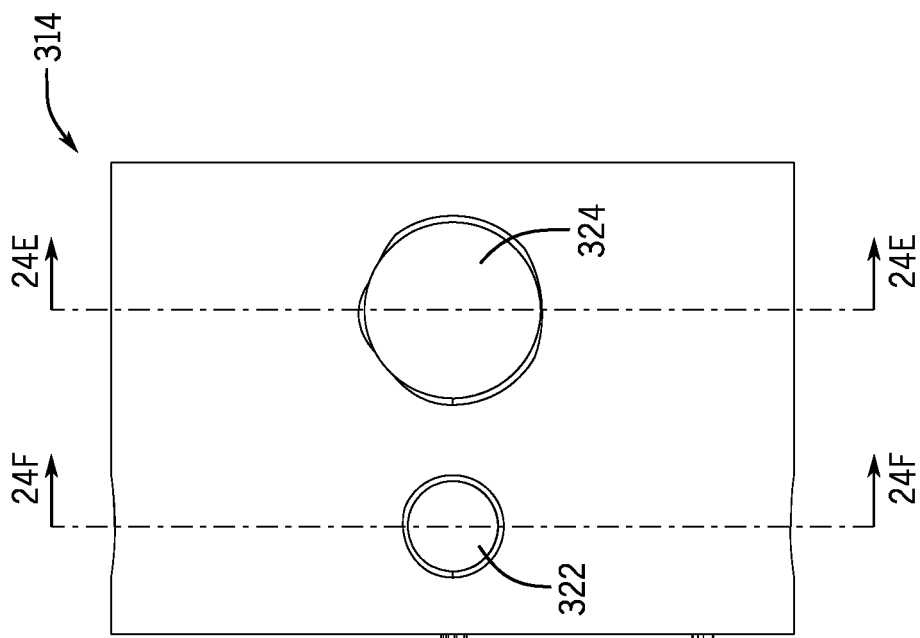
FIG. 24B is a side view of the valve housing of FIG. 24A.
Figure 24A:
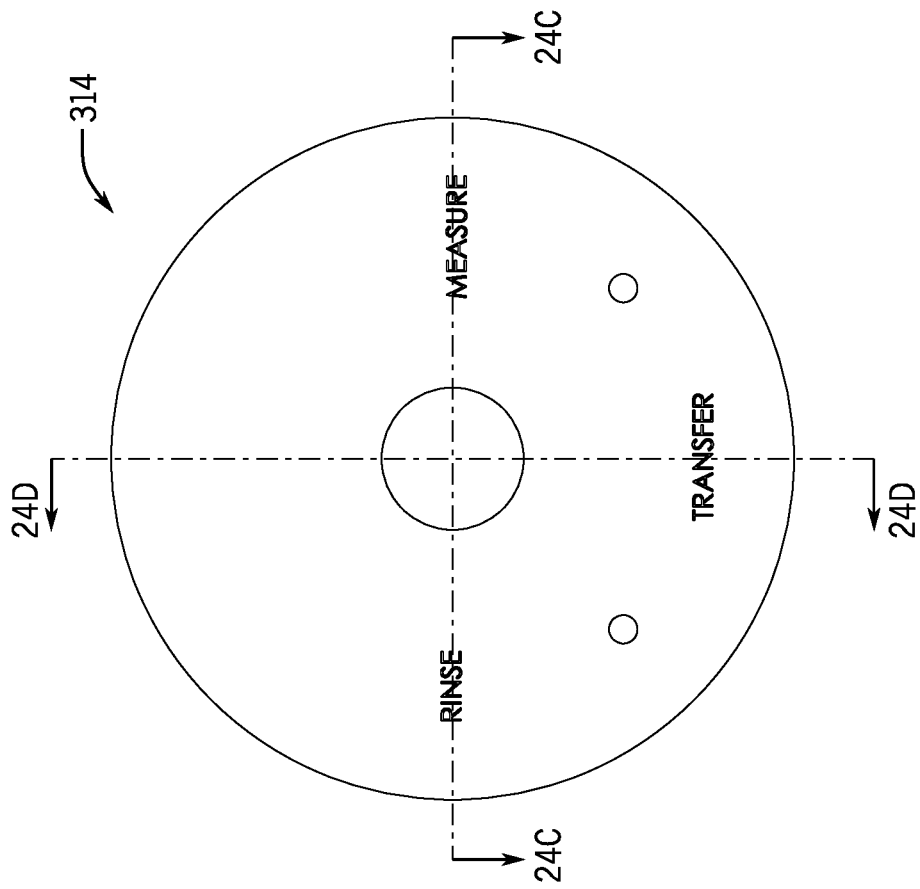
FIG. 24A is a top view of a valve housing of the multi-position valve of FIG. 23.
Figure 24C:
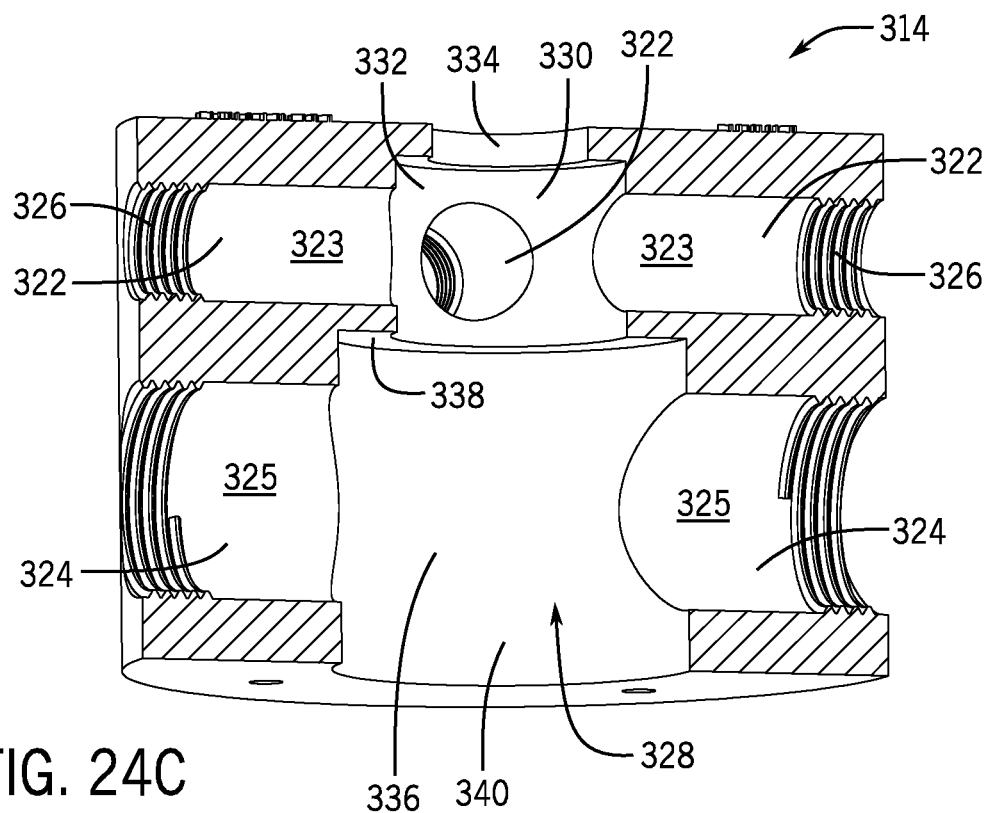
FIG. 24C is a perspective cross-sectional view of the valve housing of FIG. 24A, taken along line 24C-24C in FIG. 24A.
Figure 24D:
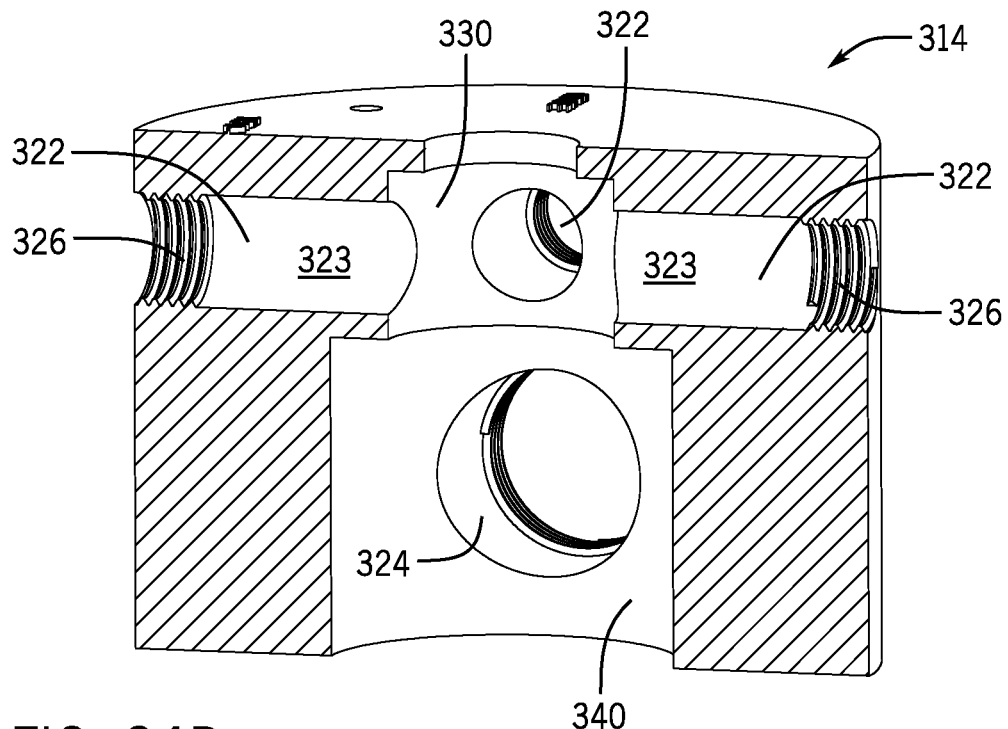
FIG. 24D is a perspective cross-sectional view of the valve housing of FIG. 24A, taken along line 24D-24D in FIG. 24A.
Figure 24E:
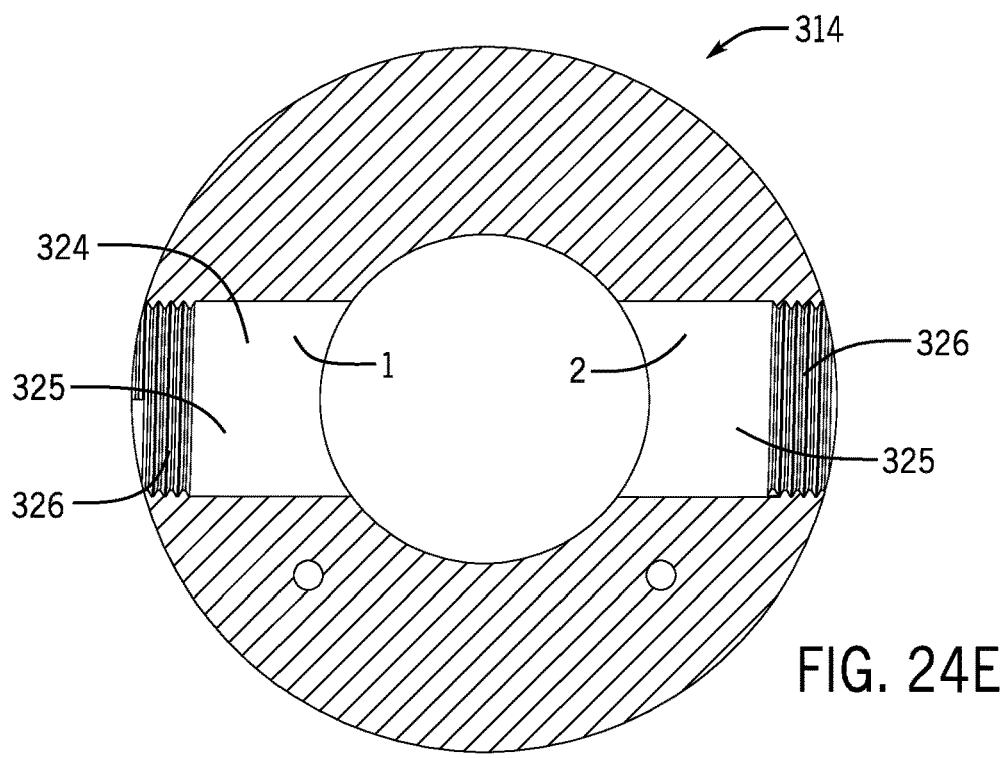
FIG. 24E is a cross-sectional view of the valve housing of FIG. 24A, taken along line 24E-24E in FIG. 24B.
Figure 24F:
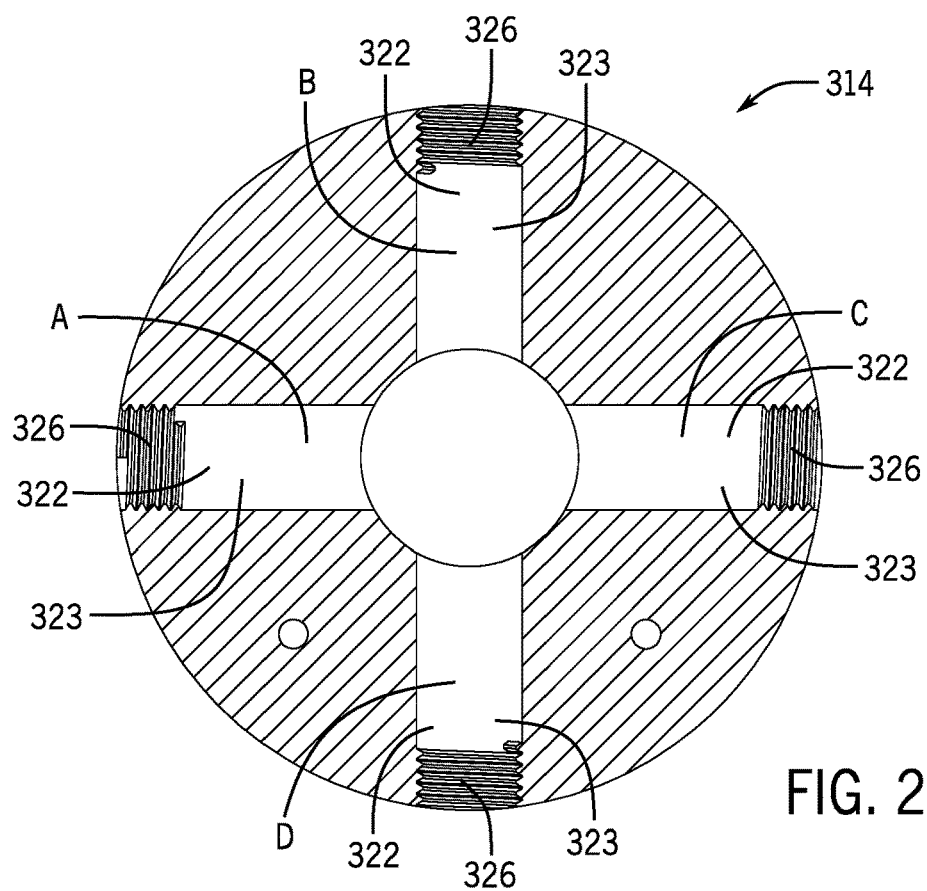
FIG. 24F is a cross-sectional view of the valve housing of FIG. 24A, taken along line 24F-24F in FIG. 24B.

FIG. 21 shows a liquid measuring system 300. The liquid measuring system 300 can controllably transfer liquid from a container (e.g., the container 104, shown in FIG. 1) into a measuring container 302 using a coupler 102, a vacuum source, and a multi-position valve 304 coupled to the vacuum source. After the liquid is transferred to the measuring container 302, it can be transferred again to a second receptacle, such as a sprayer, for example.

To use the liquid measuring system 300, a container 104 is first placed within the coupler 102. The inner housing 140 and the outlet 110 are rotated relative the body 106, which rotates the cam locking mechanism 132 to secure the cap 130 of the container 104 to the coupler 102. The handle 114 can be rotated and raised within the slot 118 to rotate and raise the probe 112. The probe tip 170 engages the plug 192 of the cap 130, which releases the plug 192 from the cap 130 and couples the plug 192 to the probe tip 170. The probe tip 170 can be further raised until it protrudes upwardly beyond the body 106 and extends into the container 104. Fluid communication between the container 104 and the outlet 110 is then established.

In some embodiments, the vacuum source can be powered on. The multi-position valve 304 can then be toggled to "MEASURE." When the multi-position valve 304 is rotated to the position corresponding to "MEASURE," the vacuum source is placed in fluid communication with the measuring container 302 (e.g., using a conduit or hose coupled to the multi-position valve 304 and the measuring container 302), which lowers the pressure within the measuring container 302. Because the measuring container 302 is in fluid communication with the outlet 110 (which is in fluid communication with the container 104, when the probe 112 is raised), the low pressure draws liquid out of the container 104, through the coupler 102, and out the outlet 110, where it enters and fills the measuring container 302. A user can view different measurement scales present on the measuring container 302 to verify that the proper amount of liquid has been transferred from the container 104 to the measuring container 302. To adjust the amount of liquid within the measuring container 302 more gradually, the handle 114 can be used to control the flow of liquid out of the container 104. In some situations, a user may need to raise and lower the handle 114 quickly to draw out only a small volume of liquid from the container 104.

Once the desired amount of liquid is present within the measuring container 302, the multi-position valve 304 can be rotated to the position corresponding to "TRANSFER." When the multi-position valve is rotated to the position corresponding to "TRANSFER," the vacuum source is placed in fluid communication with a second receptacle (e.g., using a conduit or hose), such as a sprayer (not shown), to draw the liquid within the measuring container 302 out of the measuring container 302 and into the second receptacle, where it can be dispersed.

Once the liquid within the measuring container 302 is transferred out of the measuring container 302, a rinsing process for the entire liquid measuring system 300 can be performed. The rinsing process can begin by first toggling the multi-position valve 304 to the position corresponding to "RINSE." The probe tip 170 can be extended upwardly into the container 104, and rinse water can be supplied to the inlet 108 of the probe 112. The rinse water exits and flows out of the coupler 102 through the vanes 222 of the rotating rinse head 216, which direct the rinse water upward and outward and spin the rotating rinse head 216 three hundred sixty (360) degrees about the probe tip 170 into the container 104. During the rinsing process, the vacuum source can provide suction to the outlet 110, which outputs the rinse water to a drain or other receptacle when the rinsing process is complete. When the container 104 and cap 130 are rinsed, the outlet 110 and inner housing 140 can be rotated relative to the body 106 of the coupler to unlock the cap 130 from the cam locking mechanism. Once the cap 130 is unlocked, the container 104 can be removed from the liquid measuring system 300.

Once the container 104 is rinsed, the cap 130 and probe tip 170 can be rinsed. To perform this rinsing process, the handle 114 is lowered within the slot 118 to the axial component 122, allowing the plug 192 coupled to the probe tip 170 to recouple with the cap 130. Water is introduced upward through the inlet 108 and into the groove 240 and up through the rinse water passage 244, where it can then rinse the interface between the plug 192 and the probe tip 170.

After the coupler 102 and container 104 rinsing process is completed, the measuring container 302 can be rinsed. A rotating nozzle 306 can be placed within the container. The rotating nozzle 306 can spray jets of water about the entire measuring container 302 to remove debris or residue and clean the measuring container 302 for future use. In some embodiments, the rotating nozzle is a Hypro® ProClean™ Container Nozzle. After the measuring container 302 has been adequately rinsed, the vacuum source can be powered off, and the liquid measuring system 300 is ready for a subsequent use.

The liquid measuring system 300 can further comprise overfill features to ensure that the unit does not exceed acceptable operating conditions. For example, a ball and cage calve 308 can be placed within the measuring container 302 to monitor the pressure and/or level of the fluid within the measuring container 302. If the fluid within the measuring container 302 causes the ball to raise within the cage, the ball may form a fluidic seal between the measuring container 302 and the vacuum. Accordingly, the vacuum cannot draw additional liquid into the measuring container 302, which can prevent overfilling of the measuring container 302.

An air inlet valve 310 can also be coupled to the multi-position valve 304 to introduce air into the multi-position valve 304. The air inlet valve 310 can provide air to the measuring container 302 to improve the flow of liquid between the measuring container 302 and a second receptacle. In some embodiments, the air inlet valve 310 includes a quarter-turn ball valve that can be opened or closed using a handle. A one-way check valve can also be included in the air inlet valve 310 to inhibit liquid from escaping out of the multi-position valve 304 through the air inlet valve 310. In some embodiments, the air inlet valve 310 is open to the atmosphere and draws air into the measuring container 302 when the measuring container 302 is being emptied during a "TRANSFER" process, for example.

In some embodiments, an offset measuring container 312 is used in the liquid measuring system 300 in place of the measuring container 302. The offset measuring container 312 can reduce the footprint of the liquid measuring system 300, and can enable a user to readily view the measurement markings on the measuring container 312 without moving. The offset measuring container 312 can also permit a convenient adaptation to the particular space availability on a sprayer that the liquid measuring system 300 can be coupled to.

FIGS. 23-26 illustrate the fluid flow paths through the multi-position valve 304. The multi-position valve 304 includes a housing 314, a flow control component 316, a vacuum plate 318, and an actuator 320 coupled to the flow control component 316 to rotate the flow control component 316 relative to the housing 314. The flow control component 316 can be received within the housing 314 and the vacuum plate 318, and can selectively determine the flow path of fluid through the multi-position valve 304.

In some embodiments, the multi-position valve 304 defines at least two different, interchangeable fluid flow paths. For example, the multi-position valve 304 can define a "RINSE" flow path, a "TRANSFER" flow path, and a "MEASURE" flow path. A desired fluid flow path can be selected by rotating the actuator 320 to line up with the desired multi-position valve 304 function (e.g., rinsing). The actuator 320 rotates the flow control component 316 within the housing 314 to establish the flow path corresponding to the selected function.

The flow paths defined by the multi-position valve 304 extend through the housing 314. In some embodiments, the housing 314 has a first channel 322 and a second channel 324 that extend through the housing 314. The first channel 322 and the second channel 324 can be spaced axially apart from one another, so that the first channel 322 and the second channel 324 do not intersect. The first channel 322 can extend through the housing 314 to form four similar passageways 323 A, B, C, and D defined by a first diameter. The second channel 324 can extend through the housing 314 to form two similar passageways 325, 1 and 2, defined by a second diameter larger than the first diameter. In some embodiments, exterior sections 326 of the first channel 322 and the second channel 324 are threaded to allow hoses, tubes, or other fluid transferring devices to be coupled to the housing 314. The first channel 322 and the second channel 324 are in selective fluid communication with the vacuum source, which can be toggled by the actuator 320. In some embodiments, rotation of the flow control component 316 places one passageway 325 (e.g., passageway 1) of the second channel 324 in fluid communication with the vacuum source and restricts fluid communication between the second passageway 325 (e.g., passageway 2) of the second channel 324 and the vacuum source. Additional rotation of the flow control component 316 can restrict fluid communication between the first passageway 325 of the second channel 324 and the vacuum source and can place the second passageway 325 in fluid communication with the vacuum source. The passageway 325 in fluid communication with the vacuum source can motivate flow of fluid through the first channel 322.

The flow control component 316 is received within a stepped bore 328 that can extend through the housing 314. A cylindrical outer wall 330 defined by a first wall radius extends away from a step 334 formed through the housing 314 to define a first bore 332. The first channel 322 extends inwardly toward and through the first bore 332 of the housing. A second cylindrical wall 336 extends away from a shoulder 338 to define a second bore 340. The second cylindrical wall 336 can be defined by a second wall radius larger than the first wall radius. The second channel 324 can extend toward and through the second bore 340.

The flow control component 316 extends into the stepped bore 328 to compressively engage the step 334 and shoulder 338, which restricts fluid communication (and may include various gaskets and seals) between the first channel 322 and the second channel 324 through the stepped bore 328. The flow control component 316 can include several stacked cylindrical sections, which mate with the housing 314. A first cylindrical section 344 can extend away from a key 342 formed at a distal end of the flow control component 316. A second cylindrical section 346, larger than the first cylindrical section 344, can extend away from the first cylindrical section 344 to define first mating surface 348. A third cylindrical section 350 extends away from the second cylindrical section 346 to define a second mating surface 352. When the flow control component 316 is installed into the housing 314, the first mating surface 348 can engage the step 334 to form compressive, sealing contact between the housing 314 and the flow control component 316. The second mating surface 352 can engage the shoulder 338 to form a second sealing contact between the housing 314 and the flow control component 316.

Figure 25A:
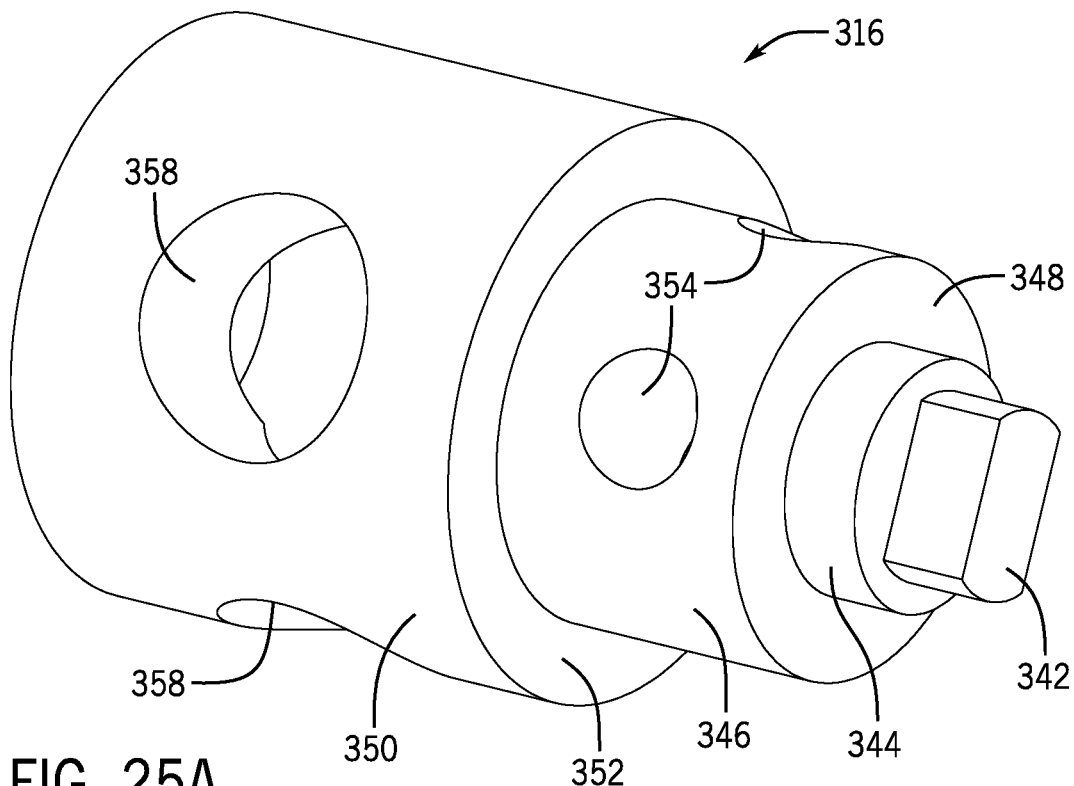
FIG. 25A is a perspective view of a flow control component present within the multi-position valve of FIG. 23.
Figure 25B:
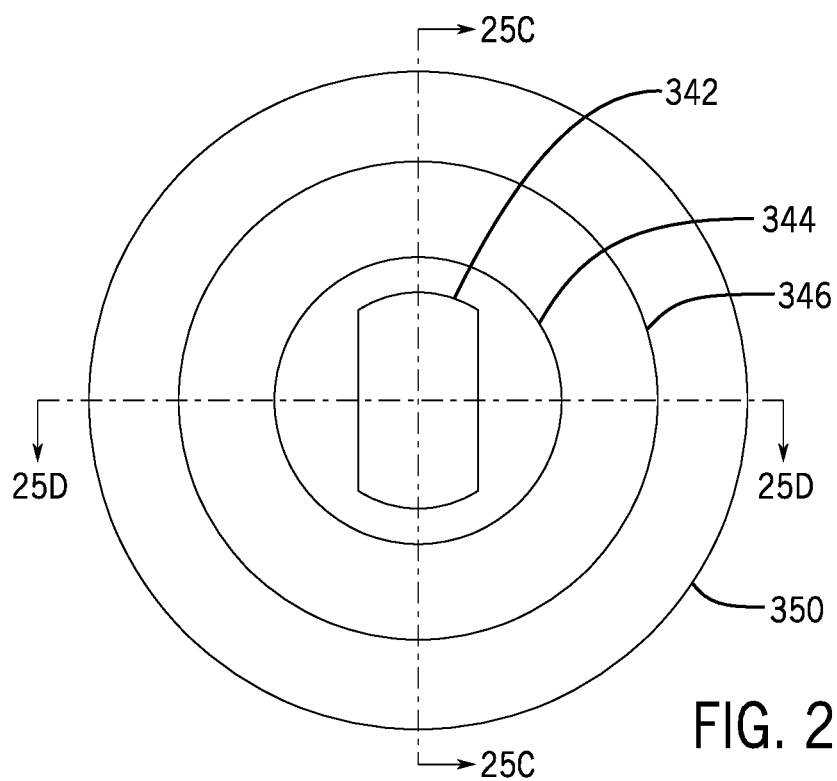
FIG. 25B is a top view of the flow control component of FIG. 25A.
Figure 25C:
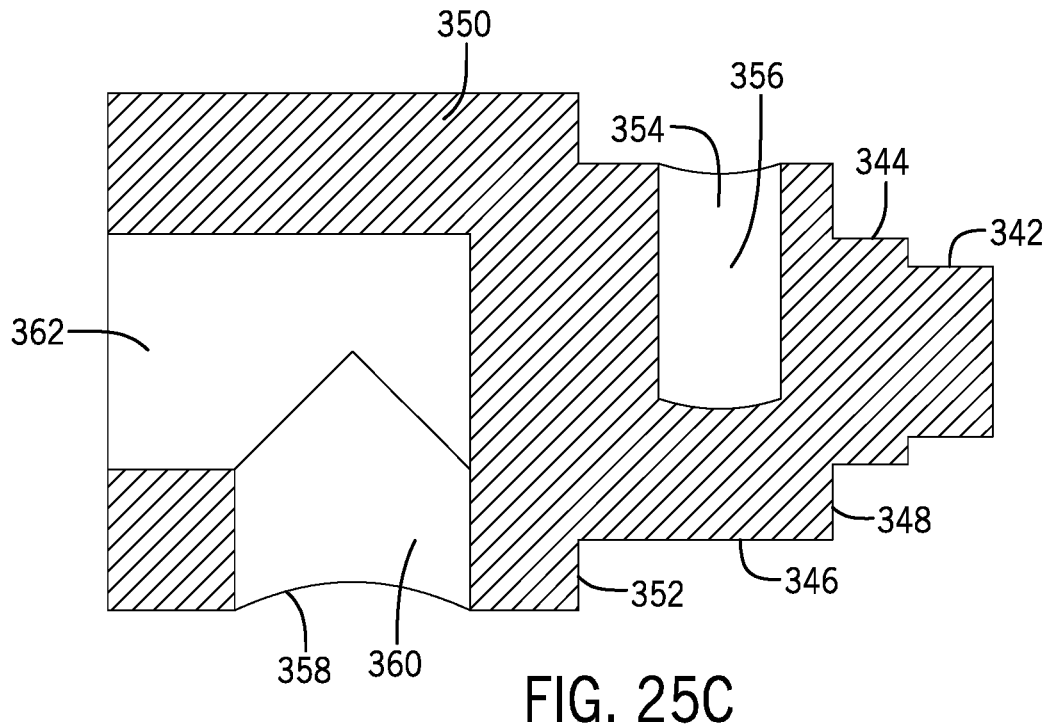
FIG. 25C is a cross-sectional view of the flow control component of FIG. 25A, taken along line 25C-25C in FIG. 25B.
Figure 25D:
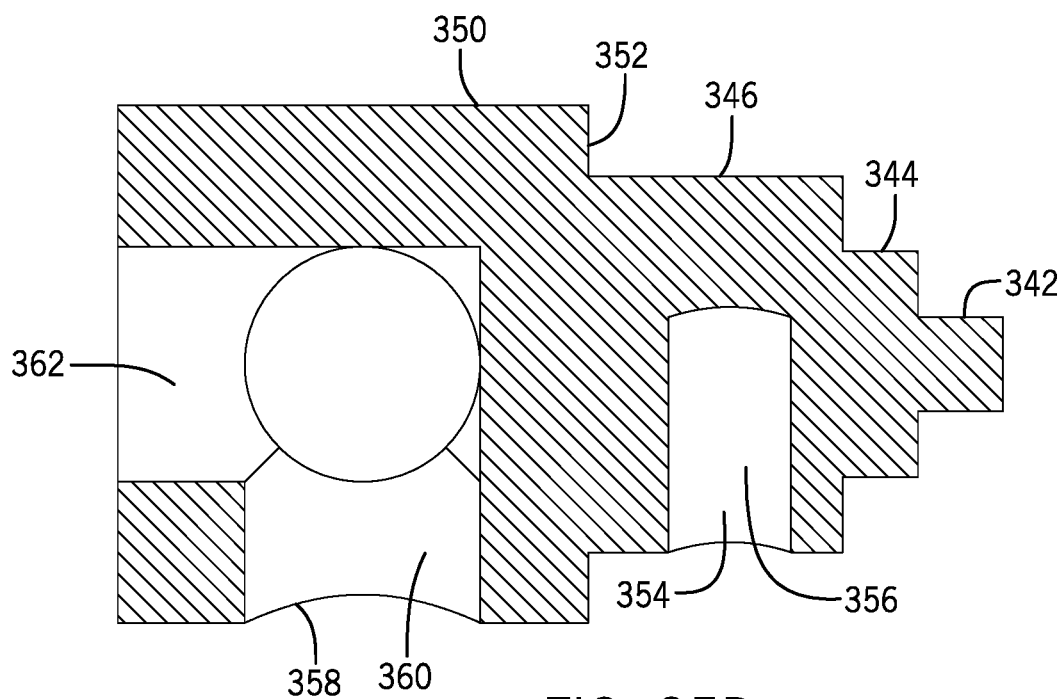
FIG. 25D is a cross-sectional view of the flow control component of FIG. 25A, taken along line 25D-25D in FIG. 25B.
Figure 26:
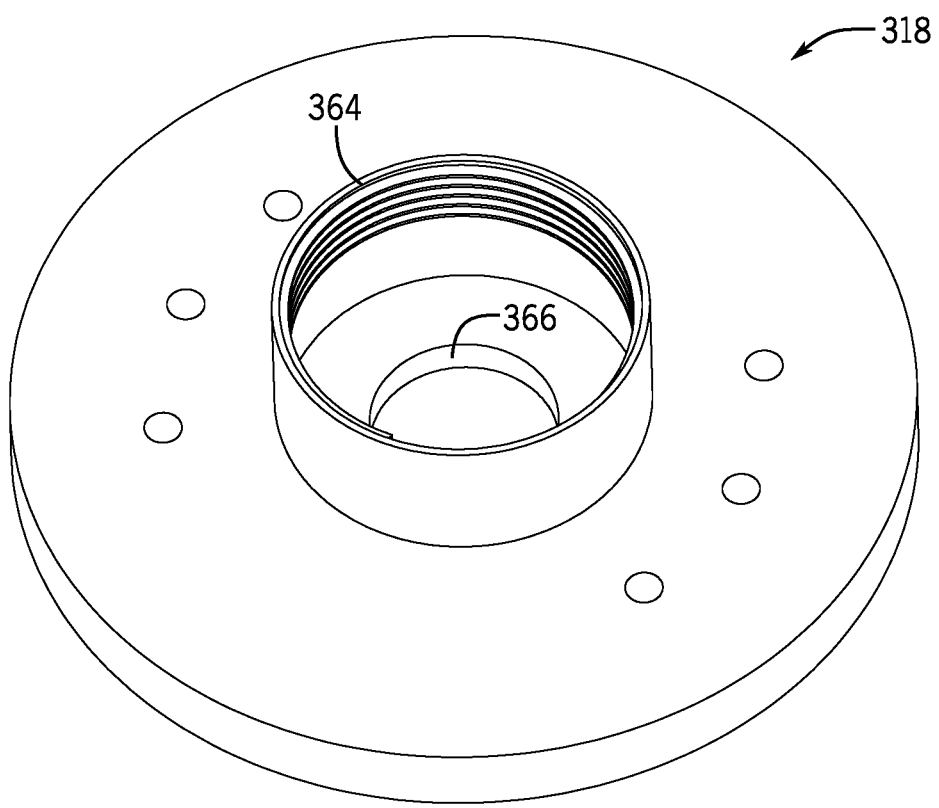
FIG. 26 is a bottom perspective view a vacuum inlet piece present in the multi-position valve of FIG. 23.

A first flow passage 354 can be formed through the second cylindrical section 346. The first flow passage 354 can have an L-shape formed of two channels 356 extending inwardly toward one another to intersect at an approximately right angle. Similarly, a second flow passage 358 can be formed through the third cylindrical section 350. The second flow passage 358 can also have an L-shape formed of two channels 360 extending inwardly toward one another to intersect at an approximately right angle. In some embodiments, the second flow passage 358 is angularly offset from the first flow passage 354 by about 90 degrees. As shown in FIGS. 25A, 25C, and 25D, the channels 356 of the first flow passage 354 open upward and outward, while the channels 360 of the second flow passage 358 open outward and downward. In some embodiments, the second flow passage 358 includes a third channel 362 extending axially through a portion of the third cylindrical section 350. The third channel 362 can be placed in fluid communication with the vacuum source.

A vacuum plate 318 can be coupled to the housing 314 to secure the flow control device 316 within the housing 314. The vacuum plate 318 can have a boss 364 extending outwardly from the plate to receive the vacuum source. In some embodiments, the boss 364 is threaded, so that a vacuum hose or other tubing can be threadably coupled to the boss 364. An orifice 366 is formed through the boss 364 to place the third channel 362 and second flow passage 358 in fluid communication with the vacuum source, once it is coupled to the vacuum plate 318.

Figure 27A:
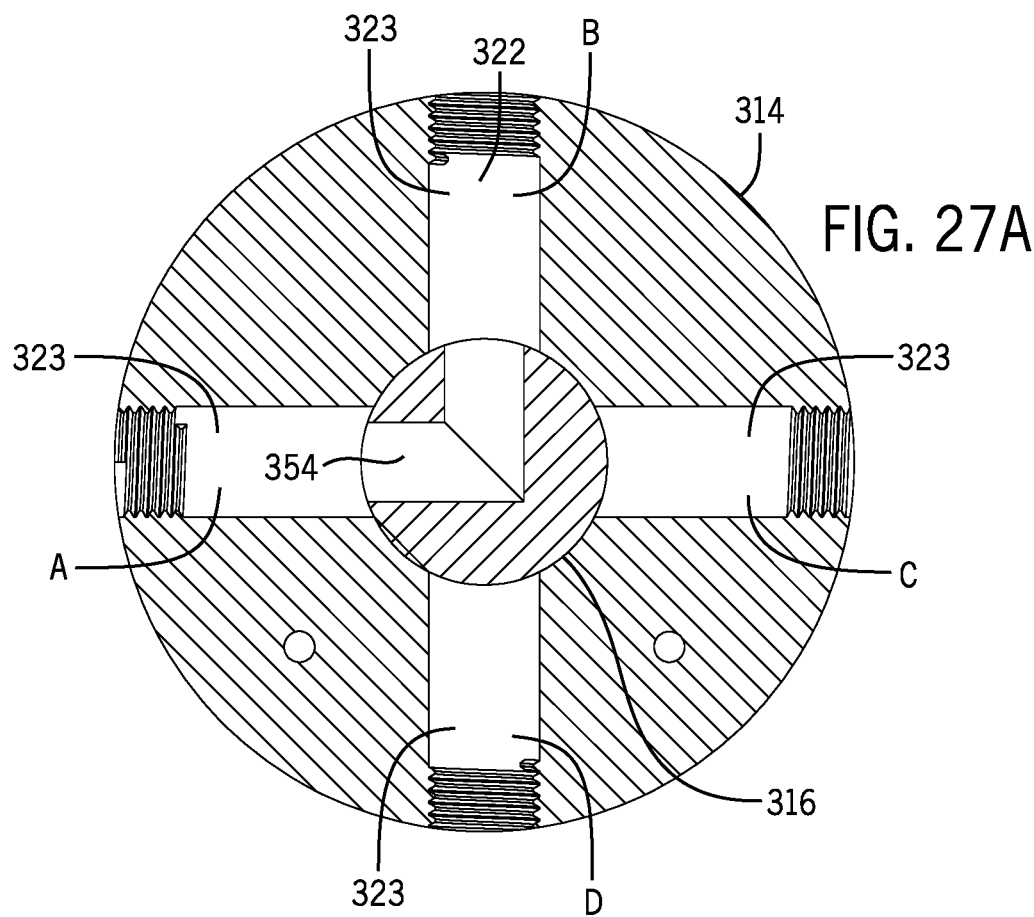
FIG. 27A is a cross-sectional view of the multi-position valve of FIG. 23 showing a first fluid path through the multi-position valve.
Figure 27B:
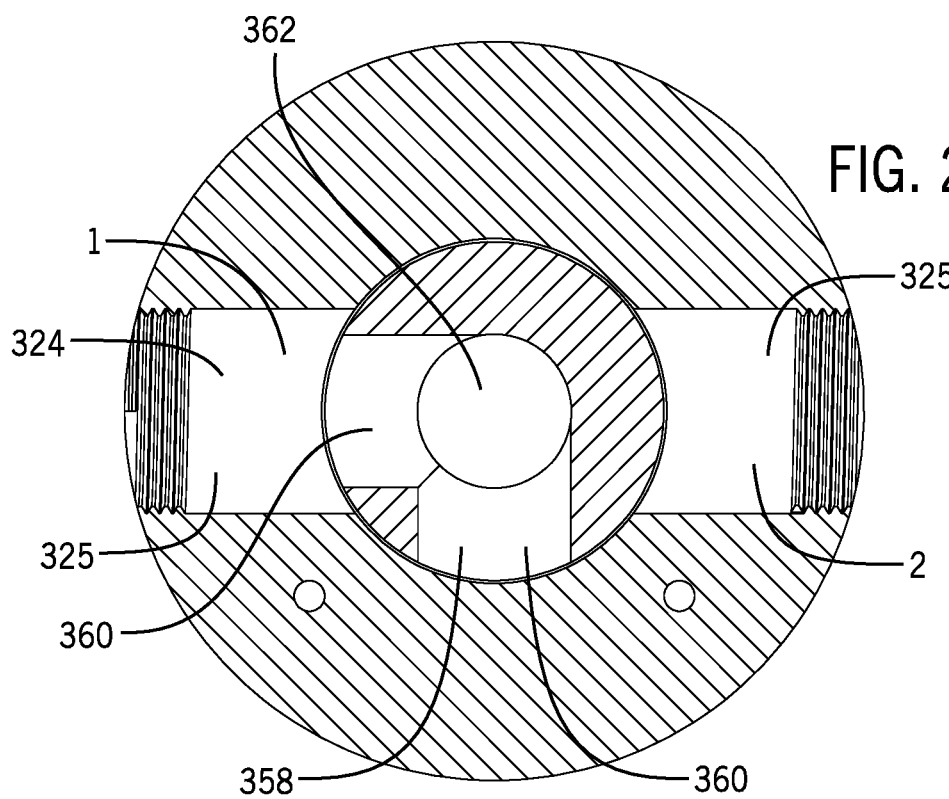
FIG. 27B is a cross-sectional view of the multi-position valve of FIG. 23 showing a second fluid path through the multi-position valve.

FIGS. 27A and 27B demonstrate the operation of the flow control device 316 when the actuator 320 is in the "TRANSFER" position. When the actuator 320 is in the "TRANSFER" position, the flow control device 316 provides a fluid flow path that removes liquid from the measuring container 302. The fluid flow path is partially defined by the first channel 322 and the first flow passage 354, which places only two of the four passageways 323 (A and B) of the first channel 322 in fluid communication with one another. Accordingly, the solid, second cylindrical section 346 of the flow control device 316 prevents fluid from flowing out of the right-hand or bottom passageway 323 (C and D), and defines a fluid flow path between the left-hand passageway 323 (A) and the top passageway 323 (B). The second channel 324 and the second flow passage 358 provide a similar function. The L-shape of the second flow passage 358 provides fluid communication between the third channel 362 and only one of the two passageways 325 of the second channel 324. If the third channel 362 is placed in fluid communication with the vacuum source, air can be removed from the third channel 362 and the passageway 325 (1) in fluid communication with the third channel 362 to direct the flow of liquid out of the measuring container 302 (and/or from the coupler 102) toward a second receptacle. To adjust the flow path, the actuator 320 can be rotated, which changes the alignment of the first flow passage 354 and the second flow passage 358 relative to the first and second channels 322, 324 to define a new flow path.

A plurality of connections can be made with the exterior sections 326 to establish fluid flow paths through the liquid measuring system 300. In some embodiments, passageway 323 (A) is connected to an air inlet valve 310, passageway 323 (B) is coupled to the measuring container 302 (e.g., via a nozzle), and passageway 323 (C) is coupled to a rinse water source. In some embodiments, passageway 323 (D) can be closed or omitted entirely. Passageway 325 (1) can be placed in communication with the bottom/outlet of the measuring container 302, while passageway 325 (2) can be placed in fluid communication with the ball and cage valve 308 and the top of the measuring container 302.

In FIGS. 27A and 27B, the multi-position valve 304 is in a "TRANSFER" position, which places the vacuum source in communication with the passageway 325 (1) in communication with the bottom of the measuring container 302. Liquid is drawn out of the measuring container 302, into the passageway 325 (1), through the channel 360, and out of the multi-position valve 304 through the third channel 362 formed in the flow control device 316. As liquid is being drained from the measuring container 302 through the multi-position valve 304, air can be introduced into the measuring container 302. Air enters through the air inlet valve 310, into passageway 323 (A), through the first flow passage 354 formed in the flow control device 316, and out the passageway 323 (B), where it can join the top of the measuring container 302 to avoid the formation of a vacuum above the liquid in the tank. Fluid may also be drawn from the coupler 102 (and/or the measuring container 302) when the multi-position valve 304 is in the "TRANSFER" position.

The multi-position valve 304 can be rotated from this position clockwise to produce a "RINSE" function, or counterclockwise to produce a "MEASURE" function. When the valve is rotated clockwise to the "RINSE" function, the passageway (1) remains in fluid communication with the vacuum source and the bottom of the measuring container 302. Any liquid (e.g., rinse water) present within the measuring container 302 can be drawn out through the passageway 325 (1), through the channel 360, and out of the multi-position valve 304 through the third channel 362. The passageways 323 (A) is then blocked by the flow control component 316, which instead places passageways 323 (B) and (C) into fluid communication with one another. Rinse water flows in through the passageway 323 (C), through the first passageway 354, upward through the passageway 323 (B), and out of the multi-position valve 304, where it can supply the rotating nozzle 306 with rinse water. After rinse water is dispensed from the rotating nozzle 306, it may be sucked out of the measuring container 302 through the multi-position valve 304.

When the valve is instead rotated counterclockwise from the position shown in FIGS. 27A and 27B, a "MEASURE" function is produced. In the "MEASURE" orientation, the vacuum source is placed in fluid communication with the passageway 325 (2), and the passageway 325 (1) is blocked by the flow control component 316. The low pressure created by the vacuum source is applied to the top of the measuring container 302 (e.g., the ball and cage valve 308), to draw flow from the outlet 110 of the coupler into the measuring container 302. The passageways 323 (A) and (D) are then placed into fluid communication with one another. As passageway 323 (D) is not coupled to anything, limited (if any) flow through the passageway 323 (A) occurs. The ball and cage valve 308 inhibits overfilling the measuring container 302—the ball and cage valve 308 is closed cutting off suction as the liquid in the measuring container 302 floats the ball into a blocking/closed position.

Figure 28:
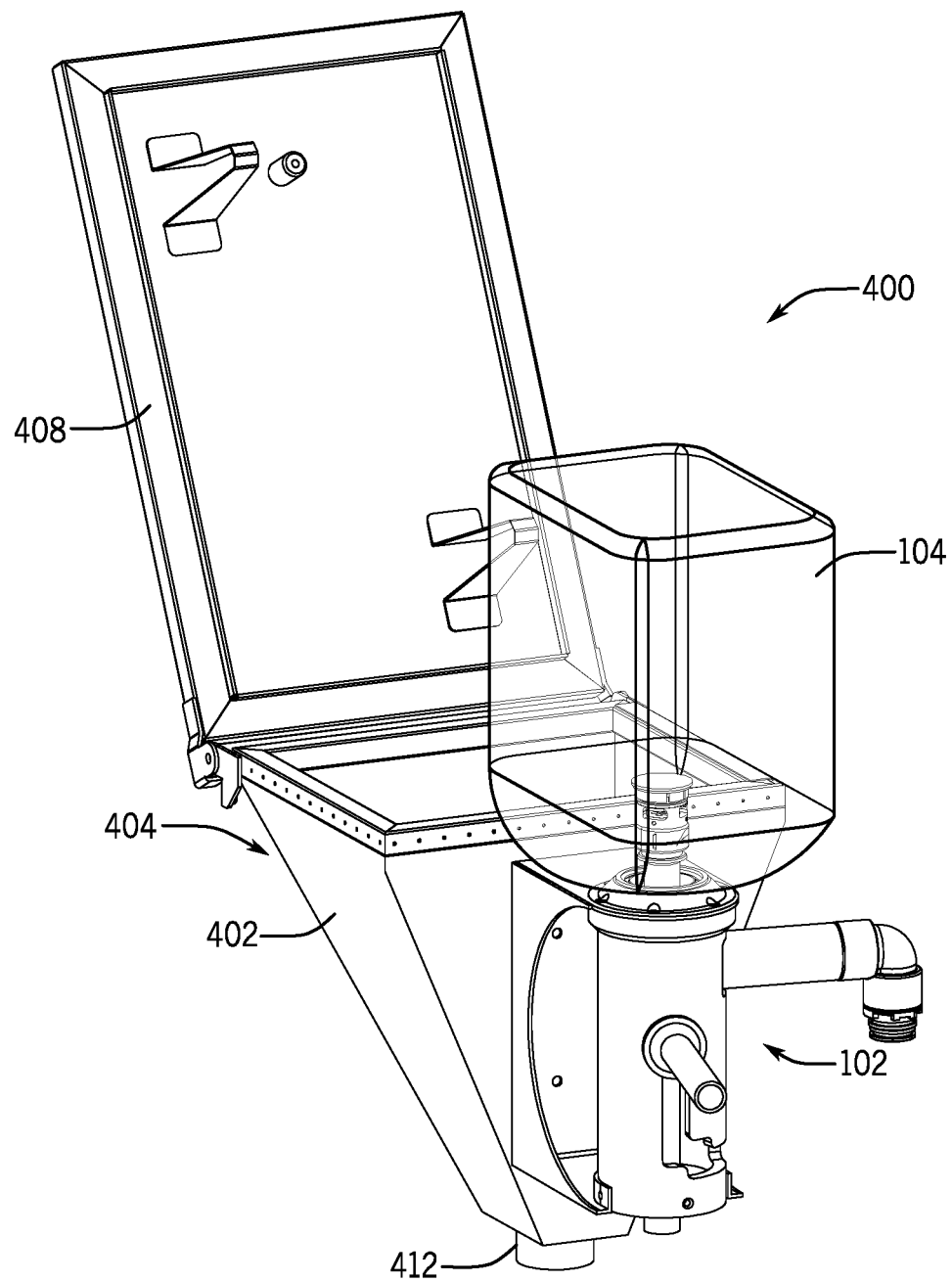
FIG. 28 is a perspective view of a chemical induction unit according to one embodiment.
Figure 29A:
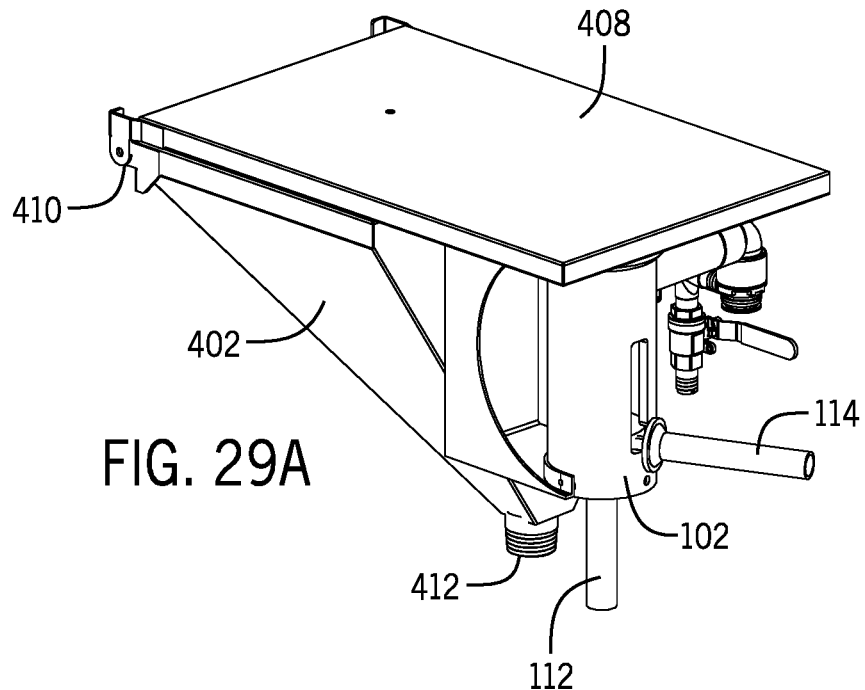
FIG. 29A is a perspective view of the chemical induction unit of FIG. 28 in a stored position.
Figure 29B:
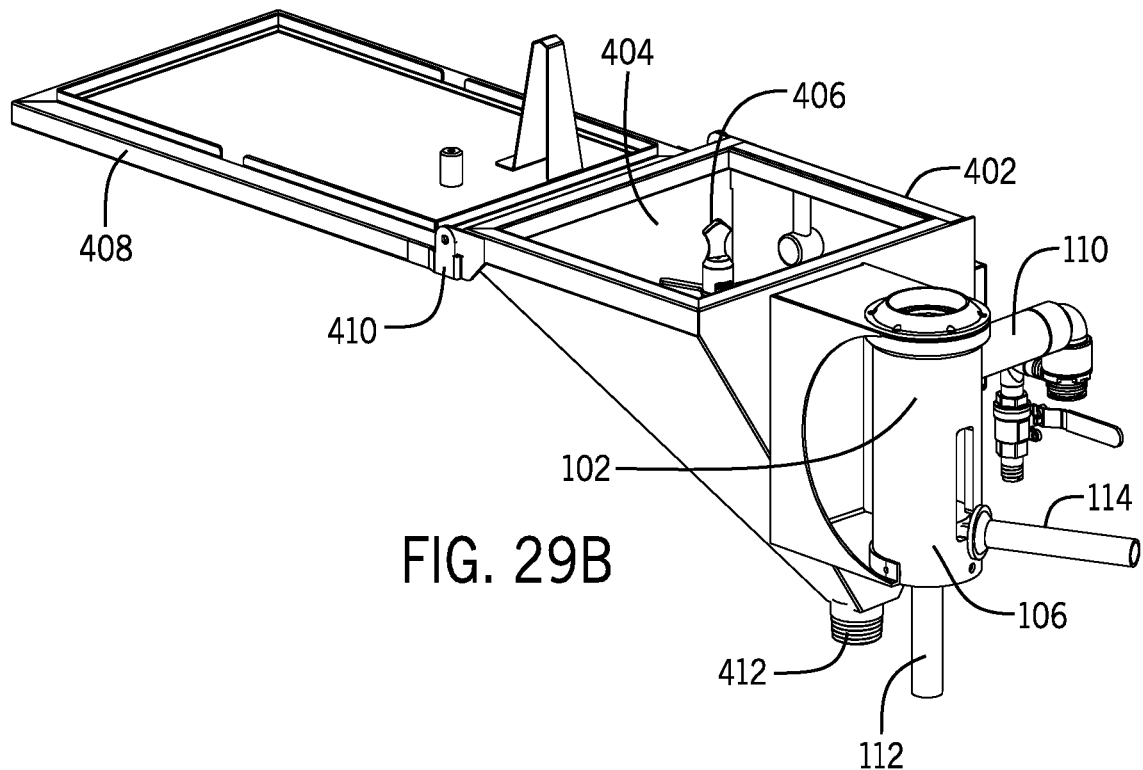
FIG. 29B is a perspective view of the chemical induction unit of FIG. 28 in an open position.

FIGS. 28-29B illustrate a chemical induction unit 400 according to one embodiment. The chemical induction unit 400 includes a drain pan 402 defining a funnel 404 and a nozzle 406 (e.g., the Hypro® ProClean™ Plus nozzle) that can be coupled to a fluid source, such as a container 104. A coupler 102 can be coupled to an outer surface of the drain pan 402. A cover 408 can be rotatably coupled to the drain pan 402 to selectively enclose the funnel 404. When the cover 408 is closed (shown in FIG. 29A), the funnel 404 can be secured. In some embodiments, the cover 408 extends outwardly beyond the drain pan 402 to cover a portion of the coupler 102. The cover 408 can be rotated upward about a hinge 410, exposing the coupler 102, the funnel 404, and the nozzle 406. In some embodiments, the drain pan 402 includes an adapter 412, which can be coupled to a suction source (e.g., a vacuum). In other embodiments, the adapter 412 can be directly coupled to a sprayer, and can rely upon gravity to transfer fluid out of the drain pan 402.

In some embodiments, the coupler 102 is used as a rinsing element to wash containers 104 and caps 130. As described above, the coupler 102 can receive the cap 130 of a container 104 into the cam locking mechanism 132. Once the cam locking mechanism 132 has been locked, the probe 112 can be raised into the container 104, where it can provide rinse water. The rotating rinse head 216 can rotate 360 degrees about the probe 112 to disperse water throughout the container 104. The rinse water can then be drained through the outlet 110. The plug 192 of the cap 130 can be washed as well. The probe 112 and probe tip 170 can be lowered into the body 106, and water can be provided to the inlet 108. The water travels upwardly through the probe 112, into the rinse water passage 244, and out from the cap rinse outlet 246, where it can clean the probe tip 170 and the plug 192 of the cap 130. The inner housing 140 can be rotated relative to the body 106 to unlock the cam locking mechanism 132, and the container 104 can be removed.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:
1. A coupler for use in a closed transfer system configured to selectively engage a container seated in fluid communication with the coupler, the coupler comprising:
 a body with a slot having an axial component;
 an outlet;
 a probe that extends from a first end portion to a second end portion and at least partially received within the body, wherein the probe has a chamber defined by an outer wall and an inner wall extending from the first end portion to the second end portion, a probe inlet extending into the chamber through the outer wall at the first end portion, and a probe outlet extending into the chamber through the outer wall at the second end portion, the probe configured to be movable relative to the body between a first position and a second position to selectively control the flow of fluid through the outlet;
 a probe tip with a cylindrical bore configured to engage the second end portion of the probe, the probe tip having a probe tip outlet configured to be substantially alignable with the probe outlet when the probe is engaged within the probe tip; and
 a handle coupled to the probe and configured to interface with the slot, wherein axial movement of the handle along the slot moves the probe between the first position and the second position.

2. The coupler of claim 1, wherein the probe is configured to restrict the flow of fluid through the outlet when the probe is in the first position and allow substantially unrestricted flow of fluid through the outlet when the probe is in the second position.

3. The coupler of claim 1, wherein the coupler is configured to meter the flow of fluid through the outlet through movement of the handle along the axial component of the slot.

4. The coupler of claim 1, further comprising a rinse head configured to rotate about the probe tip, the rinse head has an outer surface, an inner surface, and a vane extending from the inner surface through the outer surface.

5. The coupler of claim 4, wherein the vane of the rinse head is an axial vane.

6. The coupler of claim 5, wherein the axial vain is defined by two parabolic walls extending away from each other from the inner surface through the outer surface.

7. The coupler of claim 4, wherein the vane of the rinse head is a radial vane.

8. The coupler of claim 7, wherein the radial vane is defined by a channel extending tangentially from the inner surface through the outer surface.

9. The coupler of claim 4, wherein the rinse head comprises two semi-annular components.

10. The coupler of claim 1, wherein the probe tip has a top surface, a rinse outlet on the top surface, and a rinse fluid passage that extends downward from the rinse outlet configured to be in fluid communication with the probe tip outlet.

11. The coupler of claim 10, wherein the probe tip has a drain passage that extends downward from the top surface.

12. A coupler for use in a closed transfer system, the coupler comprising:
a body with an axial slot;
an outlet;
a probe with an inlet near a first end of the probe, a probe tip near a second end of the probe, and a channel configured to supply a fluid from the inlet to the probe tip, the probe at least partially received within the body and axially movable relative to the body between a first position and a second position to provide selective fluid communication through the outlet; and
a handle coupled to the probe and configured to move within the axial slot;
wherein movement of the handle within the axial slot directly corresponds to movement of the probe within the body.

13. The coupler of claim 12 further comprising a rinse head coupled to the probe.

14. The coupler of claim 13 wherein the rinse head further comprises an outer surface and an inner surface received around a portion of the probe tip and configured to rotate around the probe tip.

15. The coupler of claim 14, wherein the rinse head has an axial vane defined by two parabolic walls extending away from each other from the inner surface through the outer surface.

16. The coupler of claim 14, wherein the rinse head has a radial vane is defined by a channel extending tangentially from the inner surface through the outer surface.

17. A coupler for use in a closed transfer system, the coupler comprising:
a body having a slot with an axial slot portion and a radial slot portion;
the axial slot portion has a top end and a bottom end;
the radial slot portion has a terminal end and an intersecting end that intersects the bottom end of the axial slot portion;
a probe received within the body and movable between a first position and a second position;
a probe tip coupled to the probe; and
a handle coupled to the probe and movable along the slot, wherein movement of the handle from the terminal end to the intersecting end of the radial slot portion positions the probe for axial movement between the first position and the second position.

18. The coupler of claim 17 further comprising a rinse head with an outer surface and an inner surface received around a portion of the probe tip and configured to rotate around the probe tip.

19. The coupler of claim 17, wherein the probe tip has a top surface and a probe tip passage configured to provide fluid communication between the probe tip outlet and the top surface of the probe tip.

\* \* \* \* \*